Jan. 31, 1961 G. A. HATHERELL ET AL 2,969,553
MULTIPLE SPINDLE MACHINE TOOL APPARATUS WITH
IMPROVED WORK HOLDING CHUCK MEANS
Filed Jan. 31, 1957 11 Sheets-Sheet 2
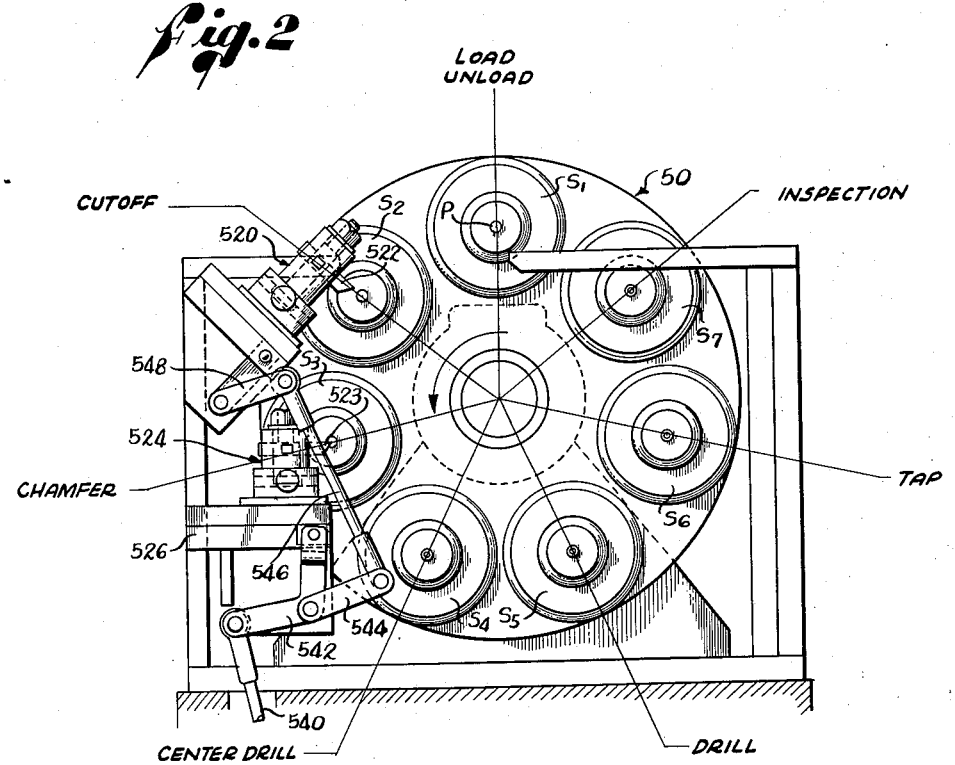
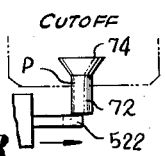 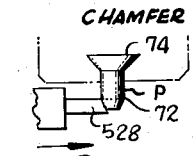 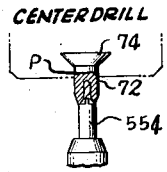 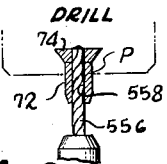
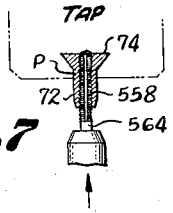 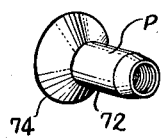
INVENTORS
GEORGE A. HATHERELL
MARTIN PADWAY
BY
Attorneys

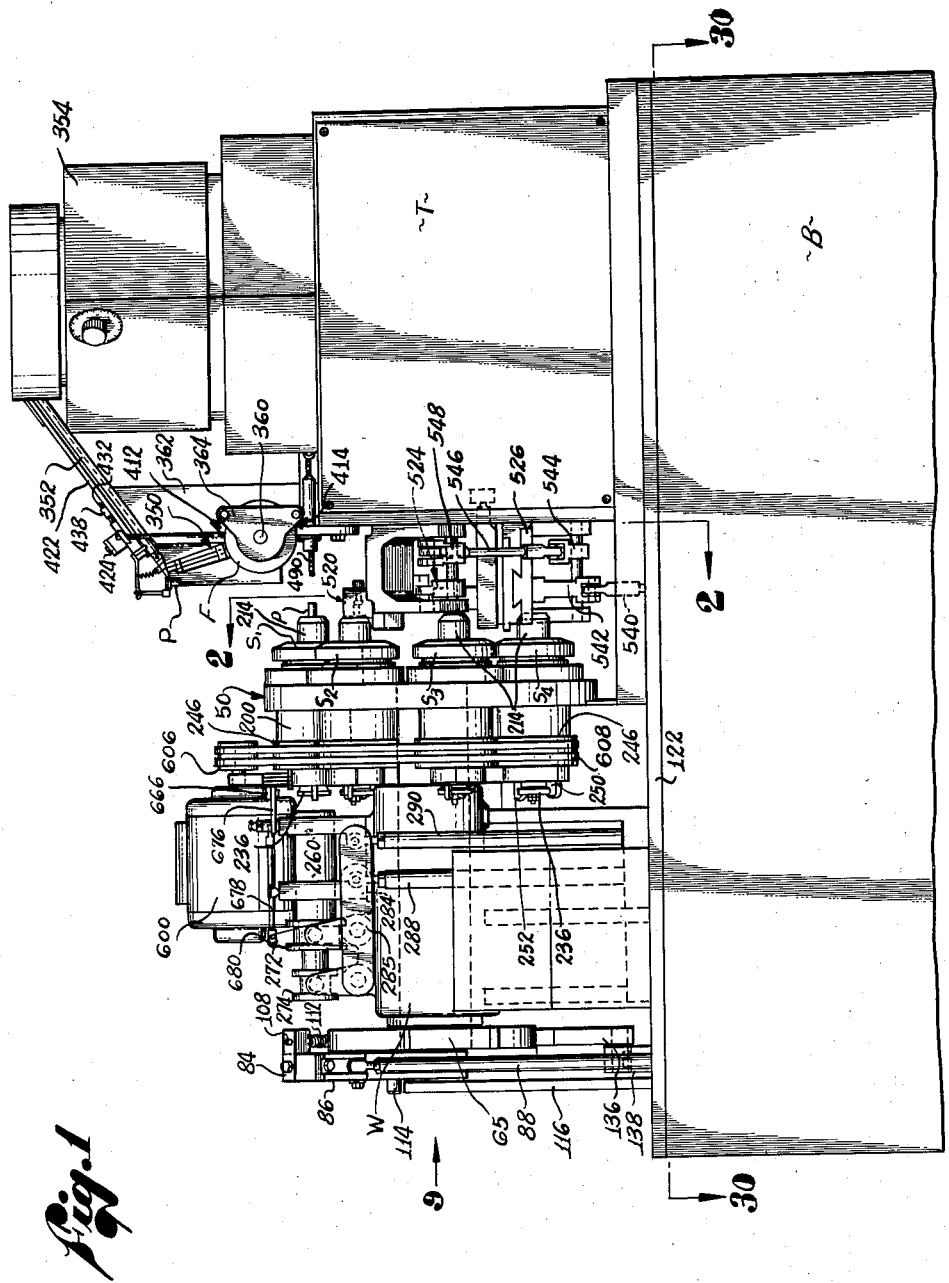

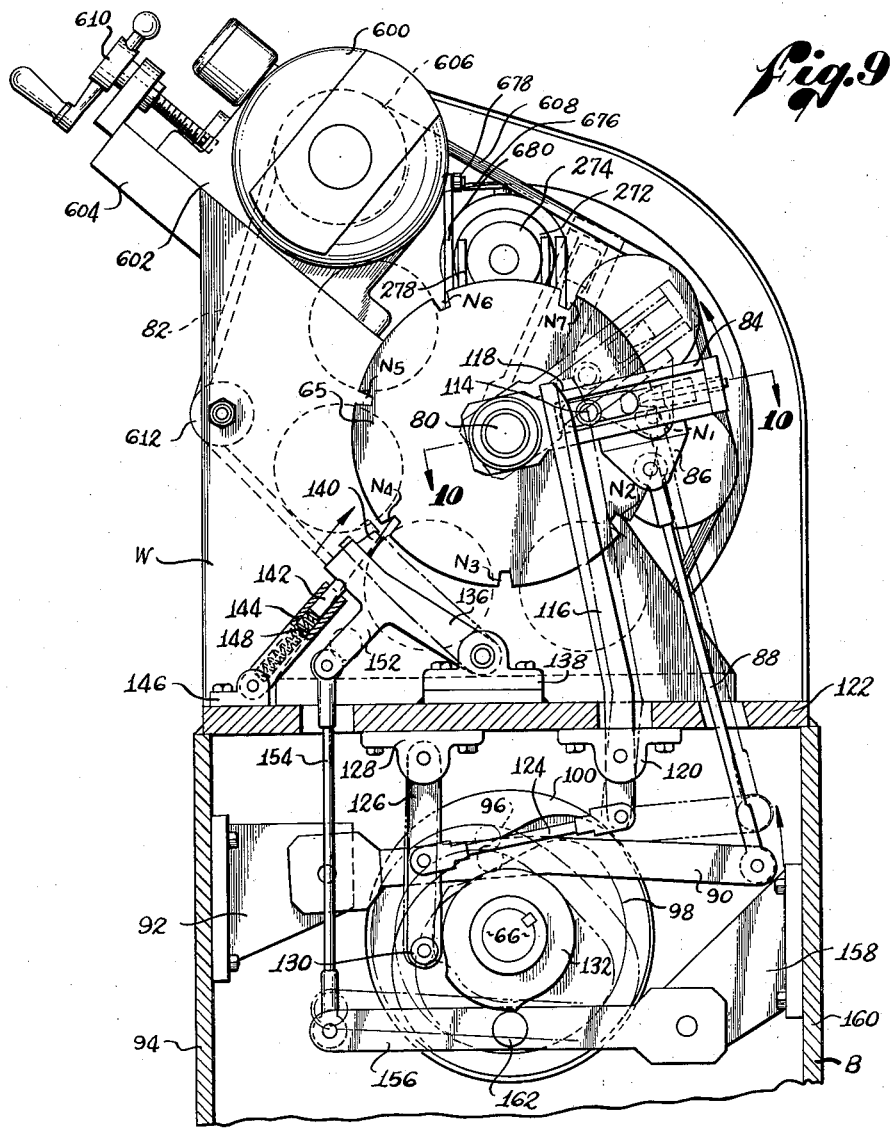

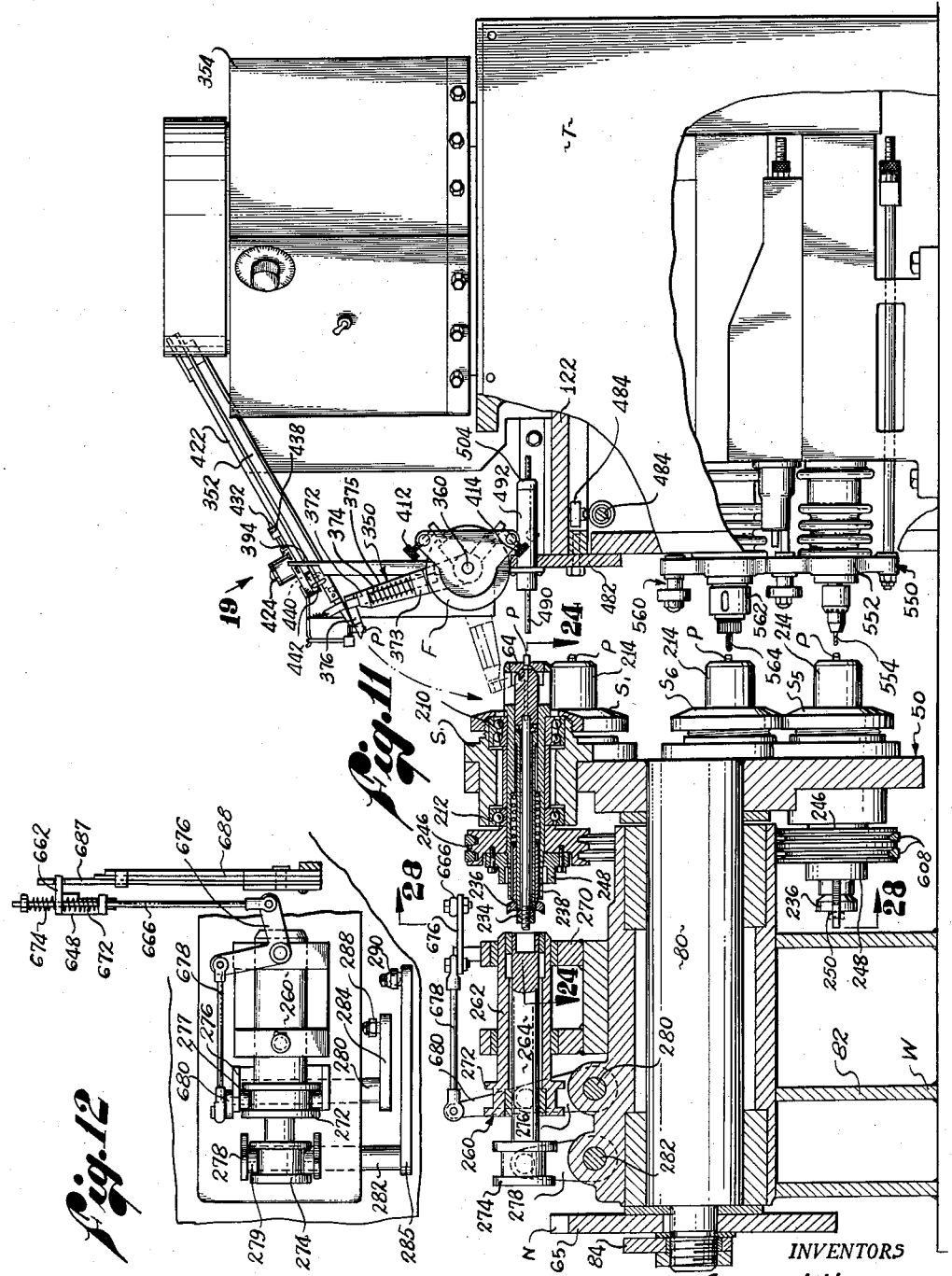

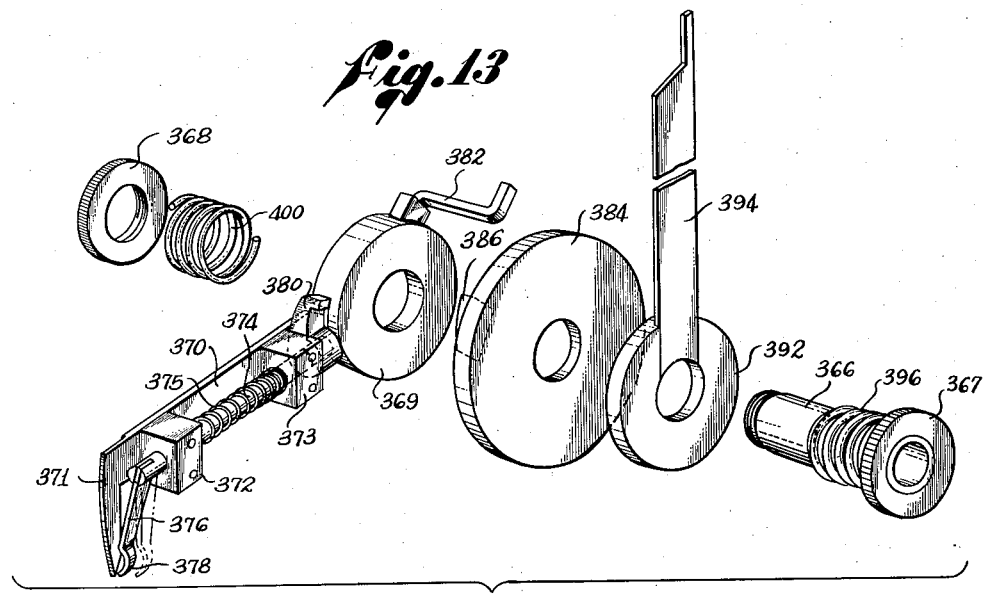
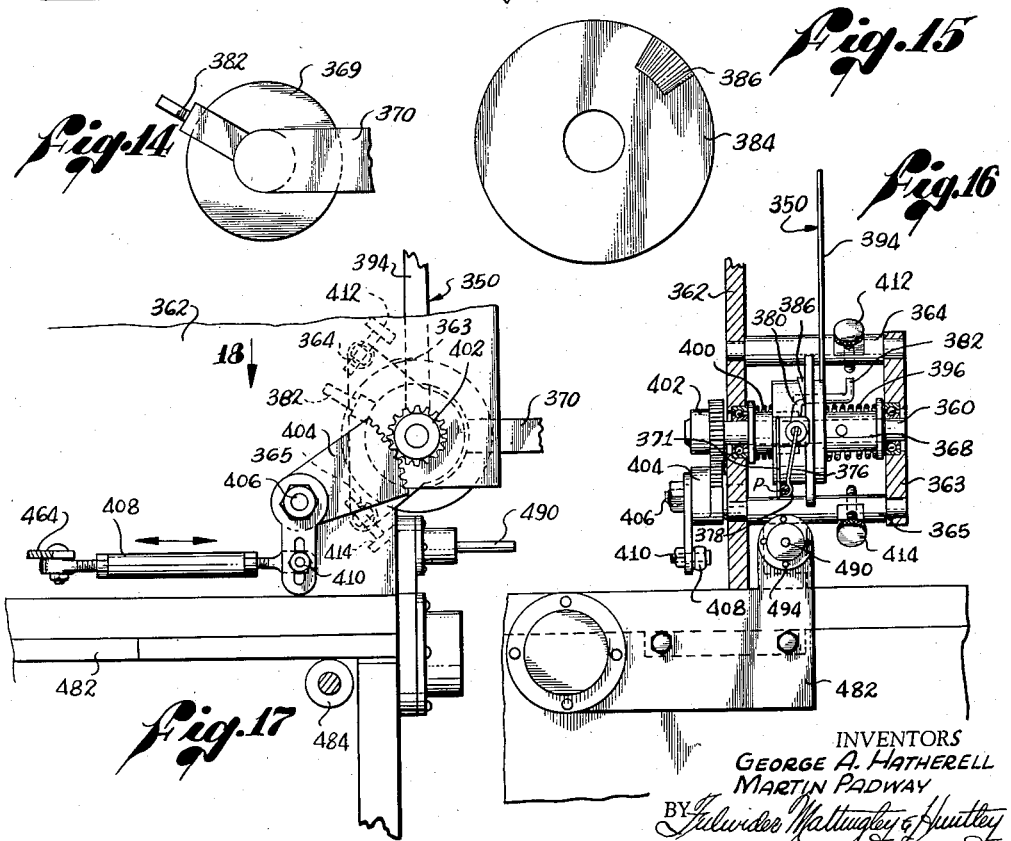

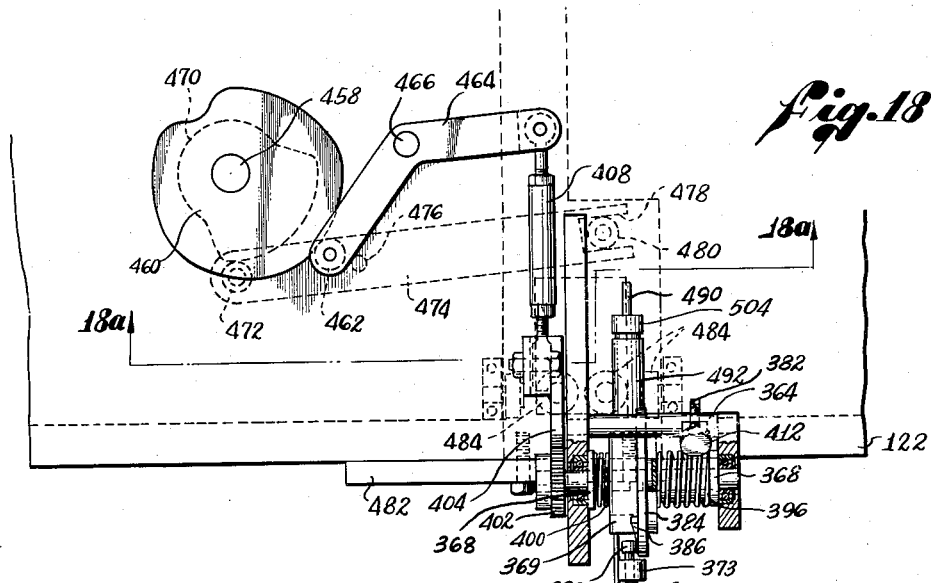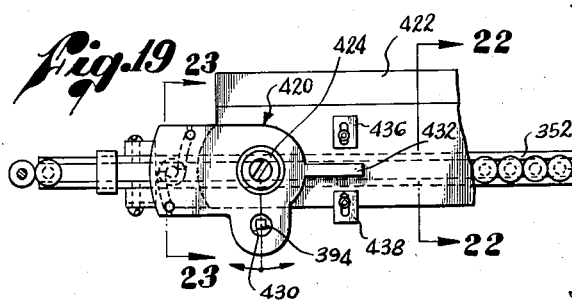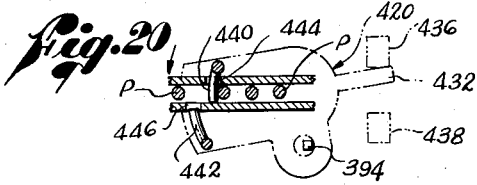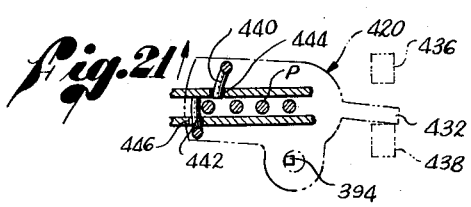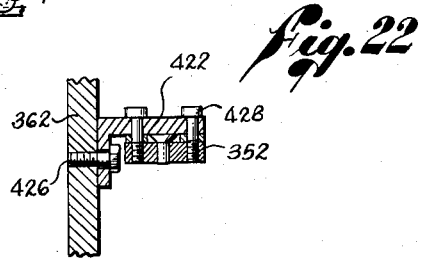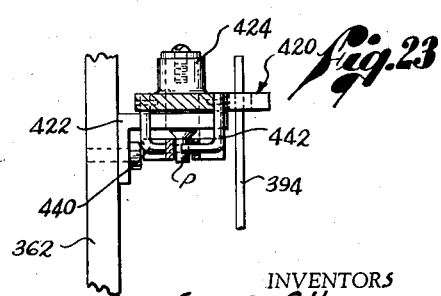
INVENTORS
GEORGE A. HATHERELL
MARTIN PADWAY
Attorneys Jan. 31, 1961 G. A. HATHERELL ET AL 2,969,553
MULTIPLE SPINDLE MACHINE TOOL APPARATUS WITH
IMPROVED WORK HOLDING CHUCK MEANS
Filed Jan. 31, 1957 11 Sheets-Sheet 7
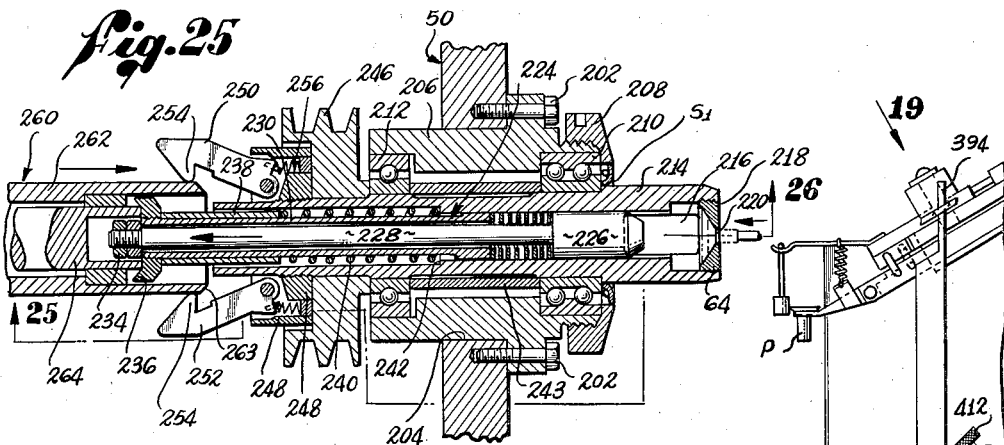
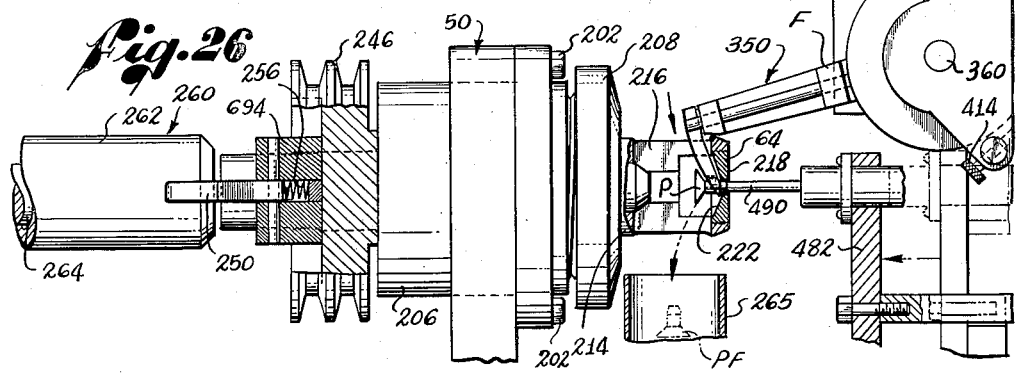
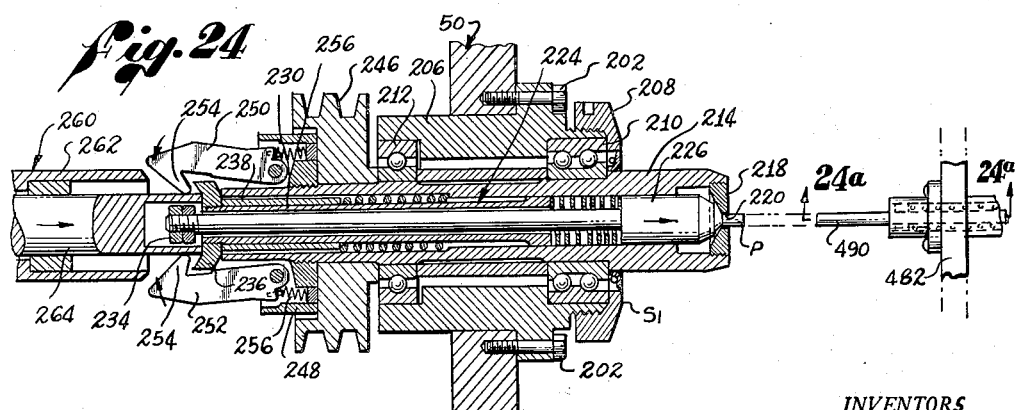
INVENTORS
GEORGE A. HATHERELL
MARTIN PADWAY
BY
Attorneys

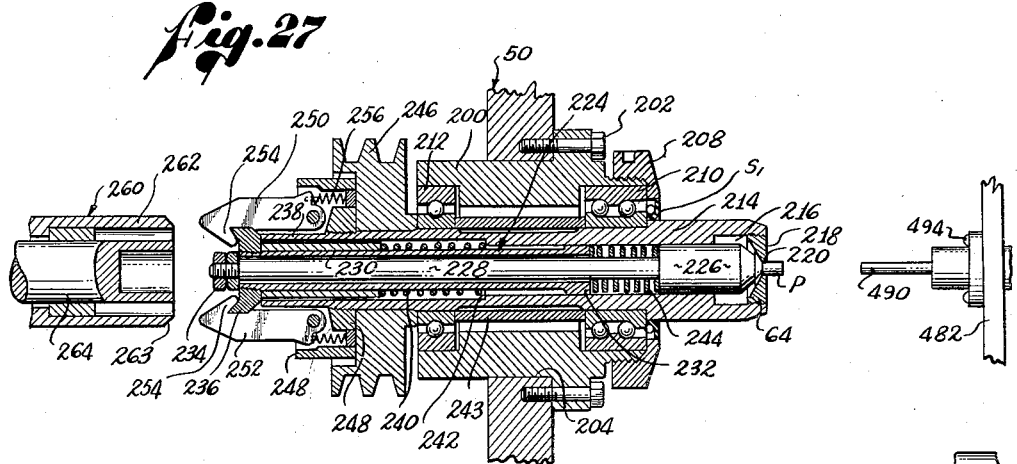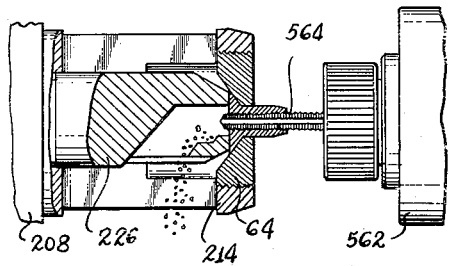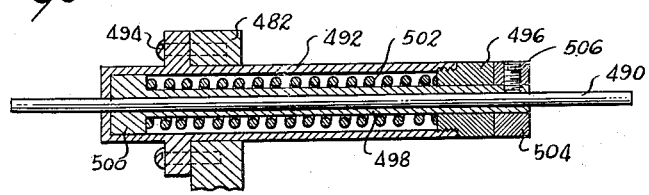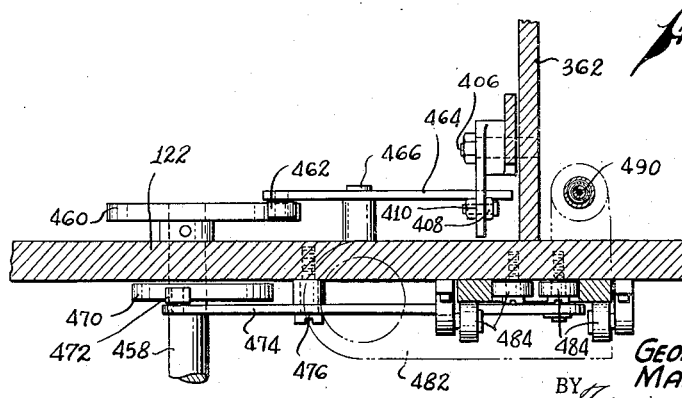

Jan. 31, 1961  G. A. HATHERELL ET AL  2,969,553
MULTIPLE SPINDLE MACHINE TOOL APPARATUS WITH
IMPROVED WORK HOLDING CHUCK MEANS
Filed Jan. 31, 1957  11 Sheets-Sheet 9

INVENTORS
GEORGE A. HATHERELL
MARTIN PADWAY
BY Fulwider Mattingly & Huntley
Attorneys Jan. 31, 1961 G. A. HATHERELL ET AL 2,969,553
MULTIPLE SPINDLE MACHINE TOOL APPARATUS WITH
IMPROVED WORK HOLDING CHUCK MEANS
Filed Jan. 31, 1957 11 Sheets-Sheet 10
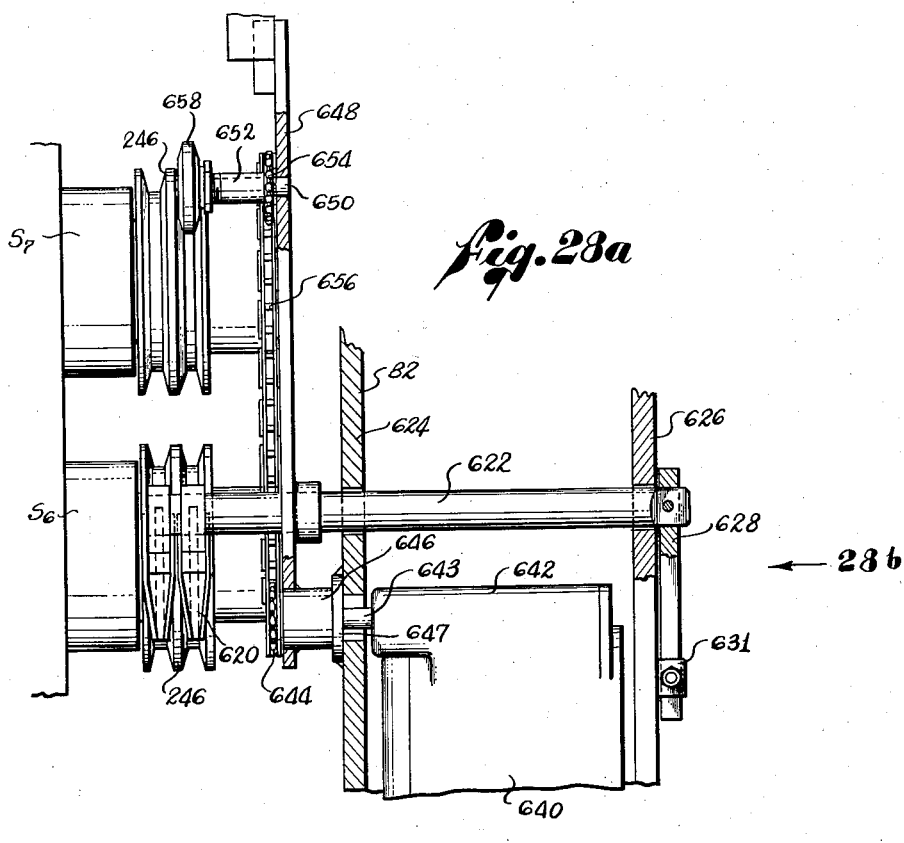
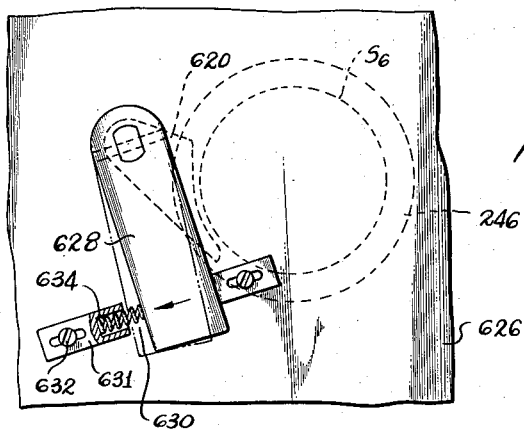
INVENTORS
GEORGE A. HATHERELL
MARTIN PADWAY
BY *Fulwider Mattingly & Huntley*
Attorneys

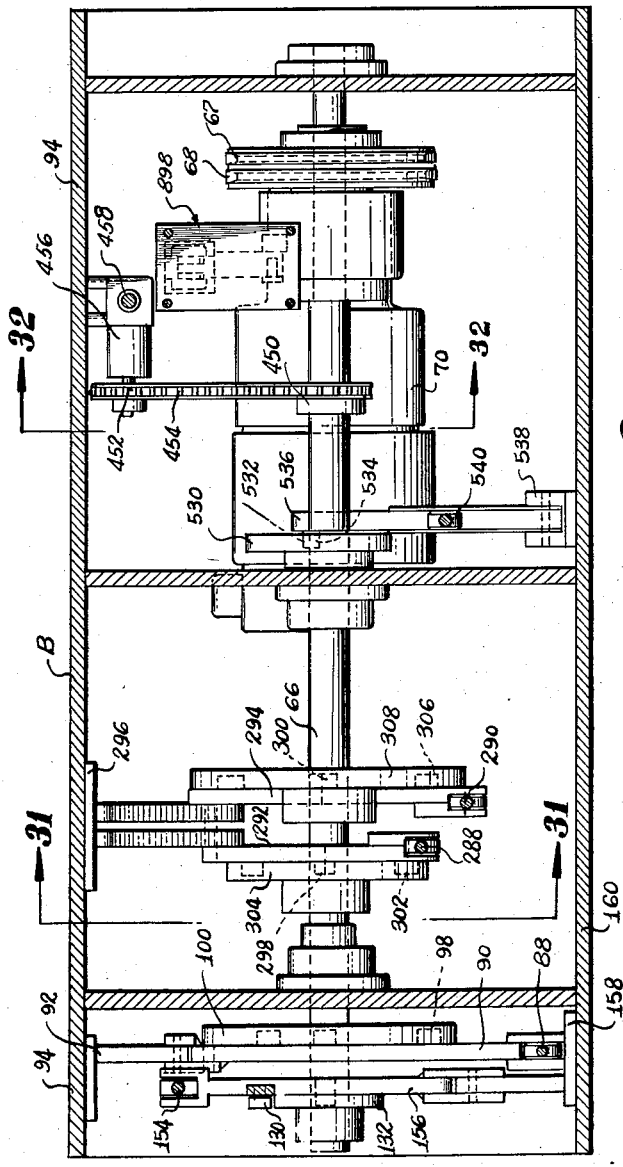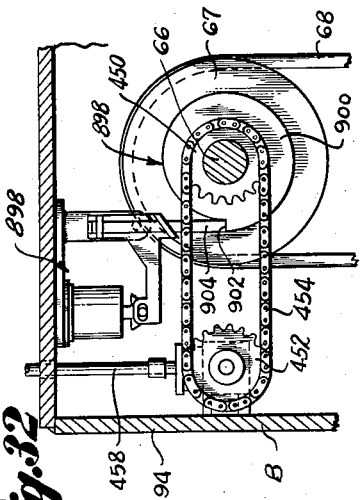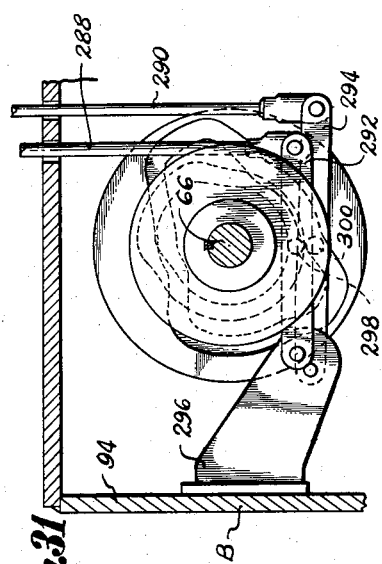
INVENTORS
GEORGE A. HATHERELL
MARTIN PADWAY
Attorneys 2,969,553
Patented Jan. 31, 1961

United States Patent Office

2,969,553

MULTIPLE SPINDLE MACHINE TOOL APPARATUS WITH IMPROVED WORK HOLDING CHUCK MEANS

George A. Hatherell, Sun Valley, and Martin Padway, Beverly Hills, Calif., assignors to The National Screw and Manufacturing Company, Cleveland, Ohio, a corporation of Ohio Filed Jan. 31, 1957, Ser. No. 637,425

27 Claims. (Cl. 10—128)

The present invention relates generally to machine tools and more particularly to a novel and improved multiple spindle automatic machine tool adapted to produce large numbers of identical parts.

When forming headed parts in the conventional multiple spindle automatic screw machine, it is necessary to provide the spindles with a chucking device for holding the part during the various machining operations. With such an arrangement, it is common for foreign matter to become lodged within the jaws of the chucking device. Upon such an occurrence, the parts being machined generally lose their concentricity. It is then necessary to shut down the machine and clean the foreign material out of the chucking device. Before the defectiveness of the machined parts is detected, however, the machine may have produced a comparatively large number thereof.

It is a major object of the present invention to provide a new and improved multiple spindle automatic machine tool.

It is another object of the invention to provide an automatic machine tool especially adapted for machining headed parts and which employs a unique part-holding structure that eliminates the necessity of utilizing the conventional chucking device.

A further object of the invention is to provide an automatic machine tool of the aforedescribed nature capable of producing a very large number of parts without requiring any attention from the operator other than the feeding of unfinished parts thereinto. Additionally, the concentricity and dimensions of the finished parts will remain substantially identical throughout the operational period.

In the conventional multiple spindle automatic screw machine the spindles are drivingly interconnected by a gear train. Such construction results in a machine which is heavy, complex, bulky and costly of construction. Additionally, the cost of servicing and maintaining such machines is comparatively expensive. It is yet a further object of the present invention to provide a multiple spindle automatic machine tool wherein the spindles are connected to a driving electric motor by an endless flexible element such as a belt. This arrangement results in a construction which is extremely light, compact and inexpensive to build and maintain as compared to the heretofore-proposed spindle drive arrangements. This belt-type arrangement also adds to the flexibility of the automatic machine tool embodying the present invention, in that it permits the number of spindles being rotated to be varied by merely changing the path of the flexible element.

Another object is to provide an automatic machine tool of the nature set forth immediately hereinabove wherein said spindles are automatically braked to a complete stop so as to permit a particular machining operation, such as tapping.

Yet a further object of the present invention is to provide an automatic machine tool which is light in weight and compact in size and having its parts readily accessible.

An additional object of the invention is to provide a unique parts-feeding mechanism for an automatic machine tool.

A more particular object of the invention is to provide an automatic machine tool having a rotatable spindle table carrying a plurality of spindles, each of the spindles being formed with a parts-receiving slot, a collet disposed in said spindle adjacent said slot and means for inserting and removing a headed part from said collet through said parts-receiving slot.

Another specific object is to provide an automatic machine tool of the nature set forth immediately hereinabove wherein one of said spindles is automatically oriented with parts-receiving slot in proper position for unloading a finished part and loading an unfinished part when the spindle table moves said spindle into alignment with the parts feeding mechanism.

These and other objects and advantages of the present invention will become apparent from the following detailed description when taken in conjunction with the appended drawings wherein:

Figure 1 is a side elevational view of a preferred form of automatic machine tool embodying the present invention;

Figure 2 is a vertical sectional view taken on line 2—2 of Figure 1;

Figures 3 through 7 are diagrammatic views showing the machining operations performed upon the part handled by said machine tool;

Figure 8 is a perspective view of a finished part produced by said machine tool;

Figure 9 is a rear elevational view of said machine tool taken partly in vertical section from the point designated 9 in Figure 1;

Figure 10 is an enlarged sectional view taken on line 10—10 of Figure 9;

Figure 11 is a side elevational view of said machine tool which has been partially taken in vertical section;

Figure 12 is a fragmentary top plan view of the portion of said machine tool shown below this figure in Figure 11;

Figure 13 is a horizontally exploded view of a parts inserting unit employed with said machine tool;

Figures 14 and 15 are side elevational views of two elements of said parts inserting unit;

Figure 16 is an end view of said parts inserting unit taken partly in vertical section;

Figure 17 is a fragmentary side elevational view of said parts inserting unit;

Figure 18 is a top plan view of said parts inserting unit;

Figure 18a is a vertical sectional view taken on line 18a—18a of Figure 18;

Figures 19, 20 and 21 are enlarged top plan views of a parts releasing mechanism employed with said parts inserting unit, and taken from the point designated 19 in Figure 11;

Figure 22 is a generally vertical sectional view taken on line 22—22 of Figure 19;

Figure 23 is a generally vertically extending sectional view taken on line 23—23 of Figure 19;

Figure 24 is a central vertical sectional view of a spindle employed with said automatic machine tool;

Figure 24a is an enlarged vertical sectional view taken on line 24a—24a of Figure 24;

Figure 25 is a view similar to Figure 24 but showing the parts of said spindle arranged in a different position;

Figure 26 is a vertical sectional view taken on line 26—26 of Figure 25;

Figure 27 is another central sectional view of said spindle but showing its parts arranged in a "locked-up" position;

Figure 28a is an enlarged sectional view taken along line 28a—28a of Figure 28;

Figure 28b is a fragmentary elevational view taken from the point designated 28b in Figure 28a;

Figure 30 is a horizontal sectional view taken on line 30—30 of Figure 1;

Figure 31 is a fragmentary vertical sectional view taken on line 31—31 of Figure 30;

Figure 32 is a fragmentary vertical sectional view taken on line 32—32 of Figure 30; and Figure 33 is a fragmentary elevational view partly in central vertical section showing a tapping operation being performed by said machine tool.

General arrangement

Figure 28:
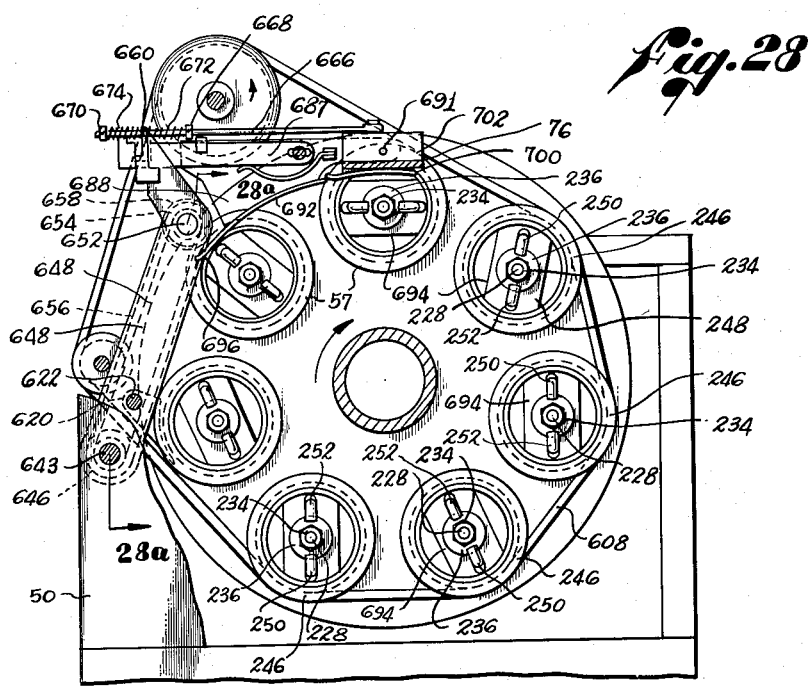
Figure 28 is a vertical sectional view taken on line 28—28 of Figure 11.
Figure 29:
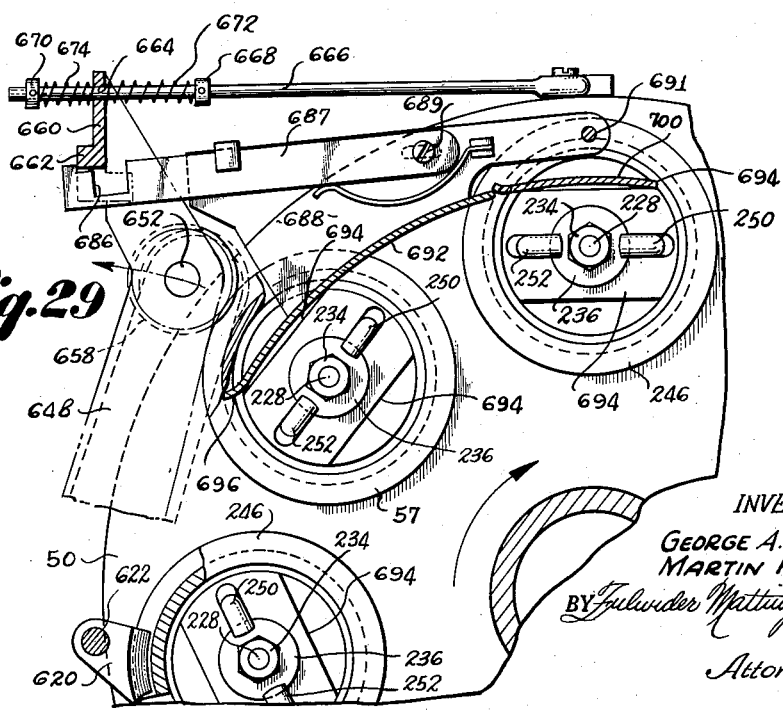
Figure 29 is a fragmentary elevational view showing the upper left hand portion of Figure 28 with certain elements thereof shown in a different position.

Referring to the drawings, the preferred form of automatic machine tool embodying the present invention includes a fixed base housing B whereon are mounted a workpiece support unit W and tool support unit T. The workpiece support unit W rotatably supports a disc-like spindle table generally designated 50. The latter carries seven equidistantly spaced spindles S1 through S7. Each spindle is identical in construction, and a collet 64 is supported by each spindle at its end proximate the tool support unit T. The spindles receive parts to be worked P from a feed mechanism F mounted upon the tool support unit T. Spindle table rotation is controlled by an indexing disc 65 that is driven by a horizontal drive shaft 66 journaled within the base housing B. This drive shaft 66 is keyed to a sheave 67 that is connected by belts 68 to a driving sheave of an electric motor 70 disposed within the base housing B, as shown in Figures 30 and 32.

The operations performed upon the parts P are shown in Figures 2 through 7, with the finished part appearing in Figure 8. Referring to these figures, the part P includes a shank 72 and a head 74. The raw parts are loaded and unloaded from the spindle S1 at the "load-unload" station shown in Figure 2. Next, the spindle table 50 is rotated counter-clockwise, relative to this figure one-seventh of a revolution so as to place the spindle S1 at the "cut-off" station. In this position the shank 72 of the part is cut to exact length, as shown in Figure 3. The spindle table 50 is then rotated counter-clockwise another one-seventh of a revolution so as to place the spindle S1 at the "chamfer" station. The desired chamfer is given to the free end of the shank 72 at this station, as indicated in Figure 4. Next, the spindle table 50 is rotated counter-clockwise another one-seventh of a revolution so as to place the spindle S1 at the "center-drill" station. The free end of the shank 72 is center drilled at this station, as indicated in Figure 5. The spindle table 50 is thereafter rotated another one-seventh of a revolution so as to place the spindle S1 at the "drill" station. As indicated in Figure 6, the shank 72 is drilled through at this station. The spindle table 50 is next rotated another one-seventh of a revolution to the "tap" station. As indicated in Figure 7, the shank 72 is tapped at this station. After the tapping operation is completed, the spindle table 50 is rotated to the "inspection" station. At this station, the dimensions of the completed part P may be checked for tolerances. Finally, the spindle table is rotated a final one-seventh of a revolution to the original "load-unload" station. At this station the finished part P will be unloaded from the spindle S1 and a new part to be worked will thereafter be inserted therein.

Indexing of the spindle table

As shown particularly in Figure 11, the spindle table 50 is keyed to a horizontal indexing shaft 80 that is carried within a frame 82 of the workpiece support unit W. The end of the indexing shaft 80 opposite the spindle table 50 is keyed to the indexing disc 65. As shown in Figure 9, the peripheral portion of the indexing disc 65 is formed with seven equidistantly-spaced notches N1 through N7. Still referring to Figure 9, rotation is imparted to the indexing disc 65 by means of a crank 84. This crank 84 is journaled upon the indexing shaft 80 outwardly of the indexing disc 65. The intermediate portion of the crank 84 is formed with a bracket 86. This bracket 86 is pivotally connected to the upper end of a rod 88. The lower end of the rod 88 is pivotally connected to the free end of a cam follower lever 90. The opposite end of the cam follower lever 90 is pivotally affixed to a bracket 92 which is in turn secured to a side wall 94 of the base housing B. The intermediate portion of the cam follower lever 90 carries a roller 96 that rides within a cam groove 98 formed in a cam wheel 100. The cam wheel 100, as indicated in Figure 30, is keyed to the drive shaft 66 journaled within hte base housing B. With this arrangement, upon each rotation of the drive shaft 66, the free end of the cam follower lever 90 will be raised and lowered between its solid and dotted outline positions of Figure 9. Such movement will effect concurrent pivotal movement of the crank 84 between its dotted and solid outline positions of this figure.

The crank 84 is formed with a radially extending slot 102. As indicated in Figures 9 and 10, a slider block 104 is slidably mounted for radial movement within this slot 102. The radially outer end of this slider block 104 fixedly carries a wedge-shaped drive dog 106. A post 108 extends radially outwardly from this drive dog 106 through a radially extending bore 110 formed at the radially outer end of the crank 84. A coil compression spring 112 is interposed between the radially outer end of the crank 84 and the drive dog 106 so as to constantly bias the latter radially inwardly. The intermediate portion of the slider block 104 is formed with a roller stud 114. This roller stud 114 is adapted to be engaged by the upper end of a generally vertically extending lever 116, the upper end of this lever being formed with a cam surface 118. The intermediate portion of the lever 116 is pivotally carried by a bracket 120 affixed to the underside of the upper wall 122 of the base housing B. The lower end of the lever 116 is pivotally connected to one end of a rod 124. The opposite end of this rod 124 is pivotally connected to a cam lever 126. The upper end of this cam lever 126 is pivotally affixed to a second bracket 128 secured to the underside of the upper wall 122. The lower end of this cam lever 126 carries a roller 130. The roller 130 rides against the periphery of a second cam wheel 132 keyed to the drive shaft 66. With this arrangement, upon rotation of the drive shaft 66, the cam surface 118 of the lever 116 will be moved between its solid and dotted outline positions of Figure 9. When the lever 116 is disposed in its dotted outline position of this figure, its cam surface 118 will engage the roller stud 114 so as to maintain the slider block 104 and its drive dog 106 in their dotted outline positions of Figure 10. At this time the radially inner end of the drive dog 108 will be maintained radially outwardly of the periphery of the indexing disc 65. When, however, the lever 116 is disposed in its solid outline position of Figure 9, spring 112 will maintain the drive dog 108 within one of the notches N of the indexing disc 65.

With continued reference to Figure 9, a locking lever 136 is positioned at the lower portion of the indexing disc 65. One end of this locking lever 136 is pivotally affixed to a bracket 138 that is secured to the upper surface of the base housing wall 122. The opposite arm of the locking lever 138 is formed with a generally wedge-shaped pawl 140 that is adapted to be received by the notches N. The pawl 140 is constantly biased radially inwardly towards the indexing disc 65 by a plunger 142. The plunger 142 is slidably carried by a tube 144 having its end opposite the plunger pivotally affixed to a bracket 146 that is secured to one side of the base housing wall 122. A coil compression spring 148 is disposed behind the plunger 142. The intermediate portion of the locking lever 136 is formed with an offset 152 that is pivotally affixed to the upper end of a generally vertically extending actuating rod 154. The lower end of this actuating rod 154 is pivotally connected to the free end of a generally horizontally extending cam lever 156. The opposite end of this cam lever 156 is pivotally affixed to a bracket 158 that is secured to the side wall 160 of the base housing B, as shown in Figure 30. The intermediate portion of the cam lever 156 carries a roller 162. This roller 162 rides against the periphery of the second cam wheel 132 that is keyed to the drive shaft 66. With this arrangement, upon rotation of the drive shaft 66, the free end of the locking lever 136 will be moved between its solid and dotted outline positions of Figure 9 so as to alternately insert and withdraw the pawl 140 from within the notches N of the indexing disc 65.

The foregoing arrangement effects intermittent rotation of the spindle table 50 in increments of one-seventh of a revolution in the following manner. Assuming that the drive shaft 66 and hence the cam wheels 100 and 132 are undergoing rotation, the crank 84 will be pivoted back and forth between its uppermost dotted outline position of Figure 9 and its lowermost solid outline position of this figure. The geometry of the cam wheels 100 and 132 and their attached levers and rods is so arranged that at such time as the crank 84 is in its uppermost dotted outline position, the drive dog 106 will be seated within one of the notches N. With the drive dog 106 so disposed the crank 84 will be pivoted clockwise one-seventh of a revolution to its solid outline position of Figure 9.

Thereafter, the lobe 170 of the cam wheel 132 will engage the roller 130 of the cam lever 126 so as to cause the lever 116 to be pivoted to the right from its solid to its dotted outline position of Figure 9. The lever 116 will thus cam the roller stud 114 and hence the slider block 104 and the drive dog 106 radially outwardly relative to the crank 84. In this manner the radially inner end of the drive dog 106 will be moved outwardly of the periphery of the index disc 65. With the drive dog 106 disposed outwardly of the periphery of the indexing disc 65, the crank 84 will be returned in a counter-clockwise direction to its original dotted outline position of Figure 9. During this counter-clockwise movement of the crank, the drive dog 106 will slide along the periphery of the indexing disc. At the conclusion of the counter-clockwise movement of the crank 84, the roller stud 114 will have slipped off the upper end of the lever 116 so as to permit the spring 112 to snap the drive dog 106 radially inwardly into the notch immediately adjacent the first notch engaged by the drive dog.

During the time the crank 84 is undergoing the afore-described clockwise movement so as to impart concurrent clockwise rotation of the indexing disc 65, the roller 162 of the cam lever 156 will be engaged by the cam lobe 170 so as to maintain the lock lever 136 in its solid outline position of Figure 9. In this position, the pawl 140 will be maintained radially outwardly of the periphery of the indexing disc 65. When, however, the crank 84 reaches its lowermost position shown in solid outline in Figure 9, the roller 162 of the cam lever 156 will have rolled off the lobe 170 of the cam 132. The spring-pressed plunger 142 will then be free to urge the pawl 140 into one of the notches N. The pawl 140 will remain in this position until the crank 84 again commences clockwise movement from its dotted outline position of Figure 9. Before such clockwise rotation begins, the lobe 170 of the cam 132 will again move the free end of the cam lever 156 downwardly so as to retract the pawl 140 from the notch N within which it is seated. The indexing disc 65 and hence the spindle table 50 will then be free to undergo another increment of rotation.

*Construction of the spindles*

The construction of the spindles S is particularly shown in Figures 11 and 24 through 27. Each of the spindles includes a flanged housing 200 which is affixed by bolts 202 within a bore 204 formed in the spindle table 50. The front portion of each housing 200 is of reduced diameter and is externally threaded to receive a retainer nut 208. The retainer nut 208 secures a front bearing assembly 210 to the front portion of the housing 200. A rear bearing assembly 212 is carried by the rear portion of the housing 200. The bearing assemblies 210 and 212 rotatably support a sleeve 214. The front portion of the sleeve 214 is formed with a transversely extending parts-receiving slot 216. The front wall of the sleeve 214 is formed with a bore 218 that threadably receives the collet 64. The collet 64 includes a coaxial bore 220 and its rear surface 222 conforms to the profile of the underside of the head 74 of the part P, as indicated in Figures 25 and 26.

The sleeve 214 axially slidably supports a lockup plunger, generally designated 224. The head 226 of this lock-up plunger 224 has an outer diameter which is somewhat less than the inner diameter of the sleeve 214. The shank 228 of the lock-up plunger 224 extends through a tube 230 having a front collar 232 corresponding in diameter to the head 226. The rear end of the shank 228 is externally threaded to receive a pair of nuts 234. The adjacent end of the tube 230 is also externally threaded to receive a lock-up nut element 236. The portion of the tube 230 rearwardly of the collar 232 is of reduced diameter relative to the inner diameter of the sleeve 214. A retainer sleeve 238 encompasses the rear portion of the tube 230. A rear coil compression spring 240 is interposed between the front end of this retainer sleeve 238 and a shoulder 242 formed on the intermediate portion of the sleeve 214. A second more powerful front coil compression spring 244 is interposed between the rear of the head 226 and the front end of the collar 232.

Rearwardly of the rear bearing assembly 212 the sleeve 214 non-rotatably caries a sheave 246. The rear portion of the sleeve 214 is externally threaded to receive a ring 248. This ring 248 locks up the front bearing assembly 210, the rear bearing assembly 212 and the sheave 246 through the medium of lock-up sleeve 243 in place upon the sleeve. The ring 248 also pivotally supports the front end of a pair of diametrically opposed latch fingers 250 and 252. These latch fingers are identical in construction and the rear end of each is formed with a hook element 254. The hook elements 254 are constantly biased radially inwardly by compression springs 256 interposed between the ring 248 and the front portion of the lacth fingers 250 and 252.

In Figures 11 and 24, 25 and 26 the spindle S1 is arranged at the "load-unload" station. When the spindle S1 arrives at this station, the plunger 224 will be disdisposed in its forward position of Figure 24, the head 226 of this plunger abutting the head 72 of the part P so as to maintain the latter within the collet 64. Thereafter, a release tube assembly 260 in a manner to be fully described hereinafter, will cause the plunger 224 to be retracted to its position of Figures 25 and 26. With the plunger in such retracted position, the machined part PF may be unloaded from the collet 64 and an unfinished part P inserted therein. Finally, after the unfinished part P has been inserted within the collet, the plunger will again be urged to its forward or locked-up position shown in Figure 27.

In this forward or locked-up position of Figure 27, the front end of the plunger's head 226 abuts the head 72 of the part P so as to maintain the underside of the part's head firmly pressed against the rear surface 222 of the collet 64. The plunger 224 is maintained in this position by the force of the front spring 244. In this regard, the front spring 244 tends to effect the rearward movement of the tube 230 relative to the sleeve 214. Such rearward movement is prevented, however, by the engagement of the latch fingers 250 and 252 with the lock-up nut element 236. The full force of the front spring 244 therefore serves to urge the plunger 224 forwardly relative to the tube 230 and hence the sleeve 214.

When a machined part is to be loaded and unloaded from the spindle, the release tube assembly 260 is moved forwardly towards the rear of the spindle by a mechanism to be fully described hereinafter. The release tube assembly 260 includes an outer tube element 262, the front end of which is tapered radially outwardly and rearwardly so as to provide a cam surface 263, and a coaxial inner tube element 264. Referring now to Figure 24, the inner tube element 264 is first moved forwardly against the rear end of the lock-up nut element 236 so as to urge the tube 230 and the plunger 224 to the right in this figure. In this manner the front spring 244 is further compressed and the latch fingers 250 and 252 are maintained in their radially inner positions solely under the influence of the small springs 256. The outer tube element 262 is then moved forwardly and its tapered surface 263 will cam the latch fingers 250 and 252 radially outwardly of their position of Figures 25 and 26. Such movement of the latch fingers permits the rear spring 240 to snap the tube 230 and hence the plunger 224 rearwardly to their position of Figures 25 and 26, the rear surface of the lock-up nut element 236 engaging the front of the inner tube element 264 of the release tube assembly 260, which inner tube e'ement has been moved rearwardly, as shown in these two figures. A completed part PF may then be unloaded from the collet 64 and an unfinished part inserted therein. As shown in Figure 26, the finished part PF will fall into the upper end of a suitable chute 265. Thereafter, the outer tube element 262 of the release tube assembly 260 is moved rearwardly and the inner tube element 264 is again moved forward'y so as to urge the tube 270 and plunger 224 forwardly within the sleeve 214. The lacth fingers 250 and 252 will then be snapped inwardly by springs 256 whereby their hooks 254 may engage the lock-up nut element 236, as shown in Figure 27. In this manner, the plunger 224 will positively retain the newly-loaded part P in place within the collet 64 during the subsequent machining operations.

*The operating mechanism for the release tube assembly 260*

As shown in Figure 11, the outer tube element 262 of the release tube assembly 260 is slidably supported by an upper extension 270 of the frame 82 for axial movement toward and away from the spindle table 50. Both the outer tube element 262 and the inner tube element 264 are coaxial with the spindle S1 when the latter is disposed in the "load-unload" position. The end of the outer tube element 262 opposite the spindle S1 is formed with a grooved collar 272. The inner tube element 264 is coaxially slidably supported within the outer tube element 262 for axial movement towards and away from the spindle S1. The end of the inner tube element 264 opposite the spindle S1 is formed with a grooved collar 274. As shown in Figure 12, a first shifting fork 276 has its free end formed with a boss 277 that is disposed within the groove of the collar 272 of the outer tube element 262. A second shifting fork 278 has its free end formed with a boss 279 that is disposed within the groove of the collar 274 of the inner tube element 264. The lower end of the shifting fork 276 is affixed to one side of a horizontal shaft 280 pivotally supported by frame 82. Similarly the lower end of the second shifting fork 278 is affixed to one side of a horizontal shaft 282 that is pivotally supported by frame 82. The opposite sides of the shafts 280 and 282 are affixed to the rear ends of first and second legs 284 and 286, respectively, parallel with the tube elements 262 and 264. The front end of the leg 284 of the shifting fork 276 is pivotally connected to the upper end of a vertically extending rod 288. Likewise, the front end of the leg 286 of the second shifting arm 278 is pivotally affixed to the upper end of a second vertically extending rod 290. Referring now to Figures 30 and 31, the lower end of the rod 288 is pivotally affixed to one end of the horizontally extending cam lever 292. Similarly, the lower end of the rod 290 is pivotally affixed to the free end of a second generally horizontally extending cam lever 294. The opposite ends of the cam levers 292 and 294 are pivotally affixed to a bracket 296 that is in turn secured to the side wall 94 of the base housing B. The intermediate portion of the cam lever 292 carries a cam follower 298 while the intermediate portion of the cam lever 294 carries a cam follower 300. The cam follower 298 of the cam lever 292 is disposed within a cam groove 302 formed in a cam wheel 304. This cam wheel 304 is keyed to the drive shaft 66. The other cam follower 300 is likewise disposed within a cam groove 306 formed in a second cam wheel 308 that is keyed to the drive shaft 66.

In the operation of the release tube assembly 60, rotation of the drive shaft 66 effects concurrent rotation of the cam wheels 304 and 308. Rotation of these cam wheels will effect vertical reciprocation of the rods 288 and 290 as the cam followers 298 and 300 follow the cam grooves 302 and 306. Such vertical reciprocation of the rods 288 and 290 will effect pivotal movement of the shifting forks 276 and 278. This pivotal movement of the shifting forks will in turn effect axial reciprocation of the outer and inner tube elements 262 and 264, respectively, towards and away from the spindle disposed in the "load-unload" position in the manner described hereinbefore in conjunction with the description of the spindles.

*Construction of the feed mechanism F*

Referring to Figure 1, the feed mechanism F includes an inserter unit, generally designated 350. This inserter unit 350 is adapted to receive an unfinished part P from the lower end of the feed chute 352 of a conventional electric-powered vibratory parts unloading device 354. This device 354 is mounted at the upper portion of the tool support unit T and its construction and operation do not form part of the present invention. The unfinished part P received by the inserter unit 350 is positioned within the collet 64 of the spindle S1 disposed in the "load-unload" station.

The details of the inserter unit 350 are shown particularly in Figures 13 through 23. Referring to these figures, the inserter unit 350 includes a horizontal shaft 360 rotatably supported between an upright support wall 362 and an upright side plate 363. The support wall 362 extends between the upper portion of the tool supporting unit T and the underside of the feed chute 352. The side plate 363 is rigidly affixed to the support plate 362 by horizontal bars 364 and 365. The shaft 360 and the bars 364 and 365 are disposed transversely relative to the axis of rotation of the spindle table 50. A sleeve 366 having a collar 367 at one end is pinned to the shaft 360. The end of this sleeve 366 opposite collar 367 is threadably secured to a second collar 368. Journaled upon the intermediate portion of the sleeve 366 is a ring 369. This ring is affixed to a radially extending rocker arm 370 having a fixed finger 371 formed on its outer end. A pair of bearing blocks 372 and 373 are affixed to the rocker arm 370. These blocks journal a radially extending post 374. The radially outer end of the post 374 is formed with a parts-grasping finger 376. This parts-grasping finger 376 is aligned with the fixed finger 371 and its free end is formed with a hook 378 adapted to receive the shank 72 of an unfinished part P, as indicated in Figure 18. A coil torsion spring 375 carried by the post 374 constantly biases the parts-grasping finger 376 towards the fixed finger 371. The radially inner end of the post 374 is keyed to a dog 380. The ring 369 also fixedly carries a stop element 382 that extends parallel to the horizontal shaft 360.

Adjacent one side of the ring, 369, a disc 384 is affixed to the sleeve 366. This disc 384 is formed at one point on its peripheral portion with a wedge-shaped cam block 386 that is arranged in the circumferential path of the dog 380. A ring element 392 is journaled on the sleeve 366 adjacent the disc 384. This ring element 392 is affixed to the radially inner end of a parts-release arm 394. A coil compression spring 396 is interposed between the collar 367 and the adjoining surface of the ring element 392. A second coil compression spring 400 is interposed between the collar 368 and the side of the ring 369 opposite the disc 384. The shaft 360 extends through the support wall 362 and is keyed to a pinion 402, as will be clear from Figures 16 and 17. The pinion 402 is engaged with a sector gear 404. This sector gear 404 is pivotally carried by a stud shaft 406 that is mounted in the support wall 362. The sector gear 404 is pivoted back and forth by a horizontally extending rod 408 to which this gear is pivotally attached by a bolt and nut combination 410. The rod 408 is reciprocated in the manner indicated by the directional arrow in Figure 17 by a mechanism to be described hereinafter.

It should be observed that pivotal movement of the sector gear 404 will effect concurrent rotation of the horizontal shaft 360 and hence the sleeve member 366 and the disc 384. Such rotation is transferred to the rocker arm ring 369 and to the ring 392 of the parts-release arm 394 because of the compressive pressure applied by the springs 396 and 400. The arcuate extent of the rocking movement of the rocker arm 366 is controlled by a pair of set screws 412 and 414 mounted upon the upper and lower bars 364 and 365, respectively, these set screws being engaged by the rocker arm's stop element 382 as the rocker arm is pivoted between its uppermost and lowermost positions. Upon such engagement, however, the shaft 160, sleeve 366 and disc 384 will continue to rotate through the total number of degrees imparted by the pinion 402 and sector gear 404.

Referring now to Figures 13, 16 and 24 through 27, the aforedescribed parts are so arranged that during downward movement of the rocker arm 370 from its uppermost part-receiving position to its lowermost part-release position, the dog 380 will be in sliding engagement with the adjoining face of the disc 384. At this time, the spring 375 will maintain the parts-grasping finger 376 in its solid outline position of Figures 13 and 16, i.e. proximate the fixed finger 370 and firmly holding the unfinished part P. When the rocker arm 370 reaches its lowermost or loading position shown in Figure 26, the stop element 382 will engage the upper set screw 412. This will prevent further downward movement of the rocker arm. At this time the plunger 224 of the spindle S1 will be in its retracted position of Figures 25 and 26 so as to permit the finished part PF to be pushed out of the collet (in a manner to be described hereinafter), and also to permit the unfinished part P carried by the rocker arm 370 to be lowered into the spindle's parts-receiving slot 216. After the rocker arm 370 has aligned the shank 72 of the unfinished part P with the bore 220 of the collet 64, it stops and the spindle plunger 224 will move forward to a point where part P is pushed slightly into collet 64. In this position, part P is held between the front end of plunger 226 and spring loaded pushout rod 490. Disc 384 now rotates and cam block 386 wipes along the dog 380. As such wiping takes place, the dog 380 will effect rotation of the post 374 so as to move the parts grasping finger 376 away from the fixed finger 371 to its dotted outline position of Figure 13. Accordingly, the unfinished part P will be left suspended between plunger 226 and rod 490. The shaft 360 will now commence rotation in the opposite direction so as to raise the rocker arm 368 until fingers 371 and 376 are away from opening 216. Plunger 224 now continues its forward movement to lock-up position of Figure 27. Pushout rod 490 retracts until clear of the protruding end of part P. Shaft 360, in the meantime, has continued to rotate so as to raise the rocker arm 368 until the stop 382 engages the lowerset screw 414. As the rocker arm is raised, the rocker arm 369 and the disc 384 will rotate in unison with the shaft 360 since the dog 380 is still in engagement with the cam block 386, the parts-grasping finger 376 remaining spaced from the fixed finger 371. Accordingly, when the rocker arm reaches its uppermost position the fingers 371 and 376 will be spread apart to receive the shank of the next unfinished part to be worked, the latter being disposed at the lower end of the feed chute 352. With this part disposed adjacent the hook 378 the disc 384 will continue rotating in unison with the shaft 360 until the dog 380 slides off the cam block 386 and the parts-grasping finger 376 will be again urged toward the fixed finger 371 whereby the newly-received part P will be retained in the hook 378.

With continued reference to Figures 13 through 23, the parts-release arm 394 actuates a parts releasing mechanism disposed at the lower portion of the feed chute 352. This mechanism includes a gate member, generally designated 420. As shown in Figures 19, 22 and 23, the gate member 420 is pivotally attached to a generally L-shaped bracket 422 by a vertically extending pivot pin 424. The support bracket 422 is rigidly affixed to the support wall 362 by bolts 426. The underside of the bracket 422 is secured to the feed chute 352 by bolts 428. One side of the gate 420 is formed with a vertically extending bore 430. This bore 430 receives the upper end of the parts-release arm 394 and preferably this upper end will be of reduced width as compared to the major portion of this arm. With this arrangement, the gate 420 will undergo horizontal pivotal movement relative to its support plate 422 across the feed chute 352, as indicated in Figures 20 and 21. The extent of such pivotal movement will be controlled by means of an abutment pin 432 formed on the rear portion of the gate 420. This pin 432 is disposed between a pair of upstanding posts 436 and 438 mounted upon the top surface of the support plate 422. The gate 420 is also formed with a pair of release pins 440 and 442. These pins 440 and 442 extend through a pair of openings 444 and 446, respectively, formed through the opposite side walls of the feed chute 352. As will be clear from Figures 20, 21 and 23, these fingers 440 and 442 serve to release a single part P for movement towards the lower end of the feed chute 352 during each pivoting cycle of the gate 420. In this regard, the gate 420 will be moved to its parts releasing position of Figure 20 when the rocker arm 370 is in its uppermost position of Figure 11.

Referring now to Figures 17, 18, 30 and 32, the feed mechanism F is driven by the drive shaft 66. Thus, as indicated in Figures 30 and 32, a drive sprocket 450 is keyed to the drive shaft 66. This drive sprocket 450 is coupled to a driven sprocket 452 by means of a conventional chain 454. The driven sprocket 452 is keyed to the input shaft of a conventional right angle gear unit 456, which unit 456 is affixed to the side wall 94 of the base housing B. The output shaft of the gear unit 456 is keyed to a vertically extending shaft 458. With particular reference to Figures 18 and 18a the upper end of the vertically extending shaft 458 is keyed to an upper cam wheel 460 disposed above the upper wall 122 of the base housing B. The periphery of this upper cam wheel 460 is in wiping engagement with a cam follower roller 462 affixed to one end of a generally V-shaped cam lever 464. The intermediate portion of this cam lever 462 is affixed to the housing wall 122 by vertically extending pivot pin 466. The opposite end of the cam lever 464 is pivotally attached to the aforedescribed rod 408. This rod has its opposite end pivotally attached to the pinion 404, as shown particularly in Figure 17. With this arrangement, rotation of the upper cam wheel 460 will effect the desired pivotal movement of the sector gear 404.

The parts ejecting mechanism

With continued reference to Figures 18 and 18a, it will be observed that a lower cam 470 is keyed to the vertical shaft 458 below the housing wall 122. The periphery of this lower cam 470 is in wiping engagement with a cam follower 472 carried by one end of a cam lever 474. The intermediate portion of this cam lever 474 is pivotally affixed to the housing wall 122 by vertically extending pivot pin 476. The opposite end of the cam lever 474 is formed with a generally rectangular recess 478. This recess 478 receives a roller 480 that depends from the underside of a horizontally disposed slide 482, as will be clear from Figures 11 and 18a. This slide 482 is supported by rollers 484 carried by the base housing B so as to be movable horizontally towards and away from the spindle table 50, between its positions of Figures 25 and 26. Such reciprocal movement of the slide 482 is obtained by rotation of the lower cam 470 through the medium of the cam lever 478 and its attached elements.

The front portion of the slide 482 carries a push-out pin 490 which serves to first push a completed part P from within the collet 64 and thereafter backs up the unfinished part replacing the finished part. This ejector pin 490 is aligned with the bore 220 of the collet 64. As shown particularly in Figures 11 and 24a, this pin is supported within a cylinder 492. The cylinder 492 is affixed to the slide 482 by means of bolts 494. The end of the cylinder 492 remote from the spindle table 50 is formed with a plug 496. This plug 496 is centrally apertured to receive a tube 498. The opposite end of this tube 498 is formed with a collar 500 which is slidable within the cylinder 492. A coil compression spring 502 is interposed between the collar 500 and the plug 496. The end of the tube opposite the collar 500 is formed with a disc-like stop 504 that abuts the plug 496 under the influence of the spring 502. The ejector pin 490 is axially adjustable relative to the tube 498 by means of a set screw 506.

Actuation of the tools

Referring now to Figures 1 through 7, 11 and 30, the tools mounted upon the tool support unit T include a cutting off tool unit 520. This cutting off tool unit includes a conventional tool 522 which is caused to move transversely relative to the part P by suitable linkage. The power required to effect such transverse movement of the tool 522 comes from the drive shaft 66 by means to be described hereinafter. The chamfering operation of Figure 4 is carried out by a suitable chamfering tool unit 524 that is rigidly secured to a sub-frame 526 of the tool support unit T. The chamfering unit includes a conventional tool 528. This tool 528 is caused to reciprocate transversely relative to the longitudinal axis of the part P by suitable linkage. This tool is also powered from the drive shaft 66. Thus, referring to Figure 30, a cam wheel 530 is keyed to the drive shaft 66 at a point intermediate cam wheels 294 and 450. The cam wheel 530 is formed with a suitable groove 532 that receives a cam follower roller 534, the latter being formed on the free end of a cam lever 536. The opposite end of this cam lever 536 is pivotally affixed to a bracket 538 secured to the side wall 160 of the base housing B. The intermediate portion of the cam lever 536 is pivotally connected to the lower end of a generally vertically extending rod 540. The upper end of the rod 540 is pivotally connected to a generally V-shaped lever 542. The intermediate portion of this lever 542 is pivotally connected to the aforedescribed subframe 526. The opposite end of the V-shaped lever 542 is pivotally connected to the operating mechanism of the chamfering tool unit 524. The intermediate portion of this lever 522 is also pivotally connected to a link 544 having its opposite end pivotally connected to the lower end of a rod 546. The upper end of this rod 546 is pivotally connected to one end of another link 548. The opposite end of this link 548 is connected to the operating mechanism of the cutting off tool unit 522. With this arrangement, upon rotation of the drive shaft 66 transverse movement of the cutting off tool 522 and the chamfering tool 528 will be accomplished, such transverse movement being properly timed with respect to the operations of the other components of the apparatus.

Referring now to Figures 5, 6, 7 and 11, the "center drill," "drill" and "tap" operations are effected by conventional tools, the details of which are not included within the scope of the present invention. The "center drill" operation is accomplished by a compressed air-actuated drilling unit, generally designated 550. This unit 550 includes a drilling head 552 which is advanced and retracted relative to the spindle table in order that its electric motor driven-bit 554 may center drill the shank 72 of the part P being worked. The "drill" operation is effected by a similar unit horizontally aligned with the unit 550 in Figure 11 and therefore hidden thereby in this figure. This drill unit is substantially identical to the center drill unit 550 and includes a bit 556 which forms a coaxial bore 558 through the shank 72 of the part P being worked. The "tap" operation is effected by a tapping unit, generally designated 560, and similar in construction and operation to the center drill and drill units. This tap unit 560 includes a head 562 that is advanced and retracted relative to the spindle table 50. This head 562 carries a tap 564 which threads the bore 558 formed through the shank 72 at the "drill" station. With particular reference to Figure 33, it should be noted that the head 226 of the lock-up plunger 224 is formed with a chip-release opening 599 that extends rearwardly and radially outwardly from the rear surface of the collet 64. This arrangement permits the escape of chips 601 formed by the top 564, these chips passing from the chip-release opening 599 through the parts-receiving slot 216 of the sleeve 214. The movement of the center drill, drill and tap tools is properly timed with respect to the other components of the apparatus in a conventional manner, the details of which are not included within the scope of the present invention.

Rotation and braking of the spindles

The spindles S are rotated when positioned at the "cut-off," "chamfer," "center drill" and "drill" stations by means of a second electric motor 600 which is mounted upon the upper portion of the workpiece supporting unit W, as shown in Figures 1 and 9. Referring particularly to Figure 9, the motor 600 is arranged upon a slide 602 carried by a vertically inclined guide 604, the guide 604 being fixedly mounted upon the upper frame 82 of the workpiece supporting unit W. The drive shaft of the motor 600 is keyed to a drive sheave 606. Rotation of this drive sheave 606 effects movement of a pair of belts 608. The tension of these belts 608 may be controlled by an adjustment crank mechanism 610 interposed between the motor slide 602 and its supporting guide 604. The belts 608 also extend about an idler sheave 612 supported at one side of the workpiece support unit W below the motor 600. Referring to Figure 9, it will be observed that the belts 608 are in contact with the sheaves 246 of the spindles disposed at the "cut-off," "chamfer," "center drill" and "drill" stations. The idler pulley 612 maintains the belts 608 out of contact with the spindle sheaves 246 when the latter are disposed at the "tap" station. Additionally, when the spindle sheaves 246 are disposed at the "inspection" and "load-unload" stations, they are spaced inwardly of the belts 608. It should be particularly observed, however, that by removing the idler sheave 612 from the path followed by the belt 608 and by either shortening the lengths of these belts or adjusting the position of the motor relative to the workpiece supporting unit W, the belts could be engaged with the sheave 246 of the spindle disposed at the "tap" station. This arranvement adds to the flexibility of operation of the present apparatus.

It should be observed that although the spindles are undergoing rotation while disposed at the "drill" station, it is essential that they be braked to a stop when they are moved to the "tap" station. The apparatus for effecting braking of the spindles is shown particularly in Figures 28, 28a, 28b and 29. Referring thereto, it will be observed that a pair of aligned brake shoes 620 are keyed to a shaft 622 that is pivotally supported between vertically extending walls 624 and 626 of the upper frame 82 of the workpiece support unit W. These brake shoes 620 are aligned with a pair of grooves formed in the spindle sheaves 246 when the latter are disposed at the "tap" station. The end of the shaft 622 opposite the shoes 620 is keyed to the upper end of a downwardly extending rocker lever 628. The lower portion of this lever 628 is disposed within a slot 630 formed in the intermediate portion of a spring block 631. The spring block 631 is affixed to one side of the frame wall 626 by bolts 632. As shown particularly in Figure 28b, a coil compression spring 634 is carried by the spring block 632 and extends into the slot 630 so as to constantly bias the lower portion of the rocker lever 628 towards the spindle sheave 246. Accordingly, the brake shoes 620 will be constantly biased into frictional contact with these sheaves. With this arrangement, when the spindle table 50 is rotated so as to move an individual spindle from the "drill" to the "tap" station, the spindle will be automatically braked by the engagement of its sheave 246 with the brake shoes 620. After a tapping operation, the spindle table 50 is rotated to move the spindle disposed at the "tap" station upwardly and to the left relative to Figure 28b. During such spindle movement, the spindle's sheave 246 will engage the brake shoes 620 and pivot them out of the path followed by the sheave. Such brake shoe movement is permitted because of the disposition of the lower portion of the rocker lever 628 within the slot 630 of the block 631, this lever being pivoted from its solid to its dotted line position of this figure as the brake shoes are pushed out of the path of the spindle sheave 246.

Orienting of the spindles

When the spindles are disposed at the "inspection" station it is desirable that they be rotated through one or more revolutions at a comparatively low rotational speed. During such rotation, the measurments and concentricity of the finished part P may be checked. Referring to Figure 28a, such rotation is accomplished by a third electric motor 640 mounted at the upper portion of the frame 82 of the workpiece supporting unit W. This electric motor 640 is coupled to a gear box 642, the output shaft 643 of which is keyed to a drive sprocket 644. The output shaft 643 extends coaxially through a sleeve 646 which is pivotally supported upon the frame wall 624 of a hub element 647. The sleeve 646 is rigidly secured to the lower end of an upwardly extending arm 648. The arm 648 supports at its upper portion a shaft 650 that is parallel to the output shaft 643 of the gear box 642. The shaft 650 journals a sleeve 652, and a driven sprocket 654 is keyed to the sleeve 652 adjacent the arm 658. This driven sprocket 654 is connected to the drive sprocket 644 by a suitable chain 656. A friction wheel 658 is keyed to the end of the sleeve 652 remote from the arm 648. The peripheral portion of this friction wheel 658 is aligned with one of the grooves of the sheave 246 of spindle S7. The upper end of the arm 648 is integrally formed with a bracket 660 having its upper end formed with a latch dog 662. The upper portion of the latch dog 662 is formed with a generally horizontally extending bore 664. The outer portion of a push rod 666 is slidably disposed within the bore 664. Inner and outer blocks 668 and 670, respectively, are affixed to the outer portion of the push rod 666. An inner coil compression spring 672 is interposed between the inner block 668 and the latch dog 664 while a second coil compression spring 674 is interposed between the outer block 670 and the latch dog 664. The opposite end of the push rod 666 is pivotally affixed to a generally V-shaped lever 676, shown particularly in Figures 11 and 12. The mid-portion of the arm 676 is pivotally affixed to the upper extension 270 of the frame 82 of the workpiece supporting unit W. The opposite end of the arm 676 is pivotally affixed to one end of a second rod 678. The opposite end of the rod 678 is pivotally affixed to the upper rod of an upward extension 680 of the shifting fork 276. As described hereinbefore, the lower end of this shifting fork 276 is affixed to the aforedescribed horizontal shaft 280 pivotally supported by the frame extension 270. With this arrangement, movement of the shifting fork 276 in the manner described hereinbefore will effect concurrent movement of the extension 680, the rod 678 and the arm 676 so as to effect reciprocation of the push rod 666 along its longitudinal axis between its positions of Figures 28 and 29.

The lower end of the latch dog 662 cooperates with a notch 686 formed at the free end of a latch finger 687. The opposite end of the latch finger 687 is pivotally affixed to a rocker member 688 by a pivot bolt 689. A spring 690 secured to the rocker member 688 constantly biases the free end of the latch finger 687 upwardly relative to Figures 28 and 29. The radially inner end of the rocker member 688 is secured to the frame 82 by a pivot pin 691. At its intermediate portion, the lower part of this guide arm 688 is formed with a guide strip 692. The guide strip 692 is arranged to be engaged with the flat surfaces 694 formed on the rings 248 of each of the spindles S. These flats 694 are parallel to one another spaced in diametric opposition relative to each ring. The leading edge of the guide strip 692 is flared, as indicated at 696, to facilitate alignment of the flats 694 with the main portion of the guide strip. The opposite end of the guide strip 692 terminates adjacent the leading edge of an anchoring strip 700. This anchoring strip 700 is formed at the lower portion of a support block 702 that is affixed to the upper frame 76 of the workpiece support unit W. The anchoring strip 700 is designed to maintain the flats 694 of a spindle S1 disposed at the "load-unload" station substantially horizontal relative to the spindle table 50. Accordingly, inasmuch as the parts-receiving slot 216 of the spindle S1 is disposed at a right angle relative to these flats, this slot will be automatically and positively arranged in the proper position to admit lower portion of the rocker arm 370 of the parts inserter unit 350.

With particular reference to Figure 28, during the time the spindle table is stopped with the spindle S7 disposed at the "inspection" station, the push rod 666 will be in its right-hand position of this figure and friction wheel 658 will be in frictional engagement with the spindle's sheave 246. Accordingly, rotation of the third electric motor 640 will be transferred to the sheave S7 and inspection of the part P carried thereby may be accomplished. At this time, the latch dog 662 will be disposed within the notch 686 of the latch finger 687, while the rocker member 688 will be rising and falling independently of the latch finger on the flats 694 of the spindle. After the friction wheel 658 has rotated the spindle through the desired number of revolutions the push rod 666 will be moved to the left to its position of Figure 29 by means of the aforedescribed push rod actuating mechanism. Accordingly, the inner spring 672 will be compressed beyond its original condition and the magnitude of the outward force exerted by this spring upon the latch 662 will be increased over its original value. When one of the flats 694 of the spindle S7 is then rotated into the position indicated in Figure 29, i.e. generally aligned with the guide strip 692, the latch finger 687 will pivot in a counter-clockwise direction from its position of Figure 28 to that of Figure 29 in unison with the rocker member 688, such movement being permitted because of the tendency of the overly-compressed inner spring 672 to push the latch dog 662 out of the notch 686. With the latch dog 662 displaced from the notch 686 the upper portion of the arm 648 will be urged away from the spindle S7 and its friction wheel 658 is withdrawn from engagement with the spindle's sheave 246. With one of the spindle flats 694 abutting the adjacent side of the guide strip 692, during rotation of spindle table 50 so as to bring the spindle S7 into the "load-unload" station, the flat 694 will slide along the guide strip 692 and onto the anchor strip 700. Accordingly, when the spindle S7 stops at the "load-unload" station, its parts-receiving slot 216 will be disposed in the proper position to permit the finished part to be unloaded from the collet 64 and a new unfinished part to be inserted therein.

*General operation*

In the operation of the aforedescribed machine, the electric motors 70, 600 and 640 will be switched on so as to effect rotation of the drive shaft 66, the spindles disposed at the "cut-off," "chamfer," "center-drill" and "drill" stations, and of the friction wheel 658. Rotation of the drive shaft 66 will effect concurrent rotation of the cam wheels 100, 156, 304, 308 and 530 keyed thereto. Accordingly, the indexing disc 65 and spindle table 50 will be caused to undergo their periodic rotational movement so as to move the spindles S from one station to the next. Likewise, the inserter unit 350 will be set into motion through the medium of the chain 454 and the elements drivingly connected thereto so as to load unfinished parts into the spindle disposed at the "load-unload" station. The cut-off tool unit 520 and the chamfering tool unit 524 will likewise be actuated upon rotation of the drive shaft 66. As noted hereinbefore, the center drill, drill and tapping units will be automatically advanced and retracted relative to the parts being machined in properly timed relationship with the movement of the other elements of the machine by a conventional electric switching arrangement. Preferably, this electrical switching arrangement will be suitably interconnected with a control circuit in such a manner that upon the malfunction of any one of these three units, the drive shaft 66 will be stopped. This control circuit should preferably also be connected with the cutting-off tool unit 520, the chamfering tool unit 524 and the parts ejecting mechanism carried on the slide 482. It is contemplated that this control circuit be suitably connected to a conventional single revolution clutch 898 so as to effect its actuation. Referring to Figure 32, this clutch 68 includes a trip cam 900 keyed to the drive shaft 66 adjacent the sheave 67 and formed with a step 902. This step 902 is engaged by the free end of an electric solenoid-operated trip bar 904 so as to effect an immediate braking of the drive shaft 66 upon the malfunction of any member arranged in the control circuit. Accordingly, the machine operator will be immediately apprised of such malfunction.

From the foregoing description, it will be apparent that the automatic machine tool of the present invention is adapted to produce machined parts that are concentric and accurately dimensioned. Such machine, moreover, may be constructed and maintained at less expense than conventional automatic screw machines. It is also lighter in weight and more compact in size than such heretofore proposed machines.

It will also be apparent that various modifications and changes may be made with respect to the foregoing description without departing from the spirit of the invention or the scope of the following claims.

We claim:

1. An automatic machine tool for machining parts having a head and a shank, comprising: a frame; a spindle table rotatably supported by said frame; a plurality of spindles rotatably carried by said spindle table, said spindles being progressively moved from a first station at which unfinished parts are loaded thereinto and finished parts are removed therefrom to a plurality of additional stations by rotation of said spindle table, and each of said spindles being formed with a parts-receiving opening that extends transversely to the spindle's axis of rotation; a collet mounted in each of said spindles in communication with said parts-receiving opening, said collets each being formed with an aperture that receives the shank of said part; means interposed between said frame and said spindles for effecting rotation of said spindles at certain of said stations other than said first station; parts loading means on said frame for inserting unfinished parts through the parts-receiving opening of the spindle disposed at said first station and positioning the shank thereof in alignment with the aperture of said collet; a part holding member in each spindle having a head that enters said opening to abut the head of said part and urge it against said collet; and means interposed between said frame and said spindles for automatically orienting the parts-receiving opening of the spindle disposed at said first station with respect to said parts loading means.

2. An automatic machine tool for machining parts having a head and a shank, comprising: a frame; a spindle table rotatably supported by said frame; a plurality of spindles rotatably carried by said spindle table, said spindles being progressively moved from a first station at which unfinished parts are loaded thereinto and finished parts are removed therefrom to a plurality of additional stations by rotation of said spindle table, and each of said spindles being formed with a parts-receiving opening that extends transversely to the spindle's axis of rotation; a collet mounted in each of said spindles in communication with said parts-receiving opening, said collets each being formed with an aperture that receives the shank of said part; means interposed between said frame and said spindles for effecting rotation of said spindles at certain of said stations other than said first station; parts loading means on said frame having an arm that extends into the parts-receiving opening of the spindle disposed at said first station and aligns the shank of an unfinished part with the aperture of said spindle's collet; a part holding member in each spindle having a head that enters said opening to abut the head of said part and urge it against said collet; and orienting means on said frame arranged in the path followed by said spindles for automatically aligning the parts-receiving opening of the spindle disposed at said first station with the arm of said parts loading means.

3. An automatic machine tool for machining parts having a head and a shank, comprising: a frame; a spindle table rotatably supported by said frame; a plurality of spindles rotatably carried by said spindle table, said spindles being progressively moved from a first station at which unfinished parts are loaded thereinto and finished parts are removed therefrom to a plurality of additional stations by rotation of said spindle table, and each of said spindles being formed with a parts-receiving opening that extends transversely to the spindle's axis of rotation; a collet mounted in each of said spindles in communication with said parts-receiving opening, said collets each being formed with an aperture that receives the shank of said part; means interposed between said frame and said spindles for effecting rotation of said spindles at certain of said stations other than said first station; parts loading means on said frame for inserting unfinished parts through the parts-receiving opening of the spindle disposed at said first station and positioning the shank thereof in alignment with the aperture of said collet; parts-ejecting means on said frame including a pin movable towards and away from the collet aperture of the spindle disposed at said first station; a part holding member in each spindle having a head that enters said opening to abut the head of said part and urge it against said collet; and means interposed between said frame and said spindles for automatically orienting the parts-receiving opening of the spindle disposed at said first station with respect to said parts loading means.

4. An automatic machine tool for machining parts having a head and a shank, comprising: a frame; a spindle table rotatably supported by said frame; a plurality of spindles rotatably carried by said spindle table, said spindles being progressively moved from a first station at which unfinished parts are loaded thereinto and finished parts are removed therefrom to a plurality of additional stations by rotation of said spindle table, and each of said spindles being formed with a parts-receiving opening that extends transversely to the spindle's axis of rotation; a collet mounted in each of said spindles in communication with said parts-receiving opening, said collets each being formed with an aperture that receives the shank of said part; means interposed between said frame and said spindles for effecting rotation of said spindles at certain of said stations other than said first station; parts loading means on said frame having an arm that extends into the parts-receiving opening of the spindle disposed at said first station and aligns the shank of an unfinished part with the aperture of said spindle's collet; parts-ejecting means on said frame including a pin movable towards and away from the collet aperture of the spindle disposed at said first station; a part holding member in each spindle having a head that enters said opening to abut the head of said part and urge it against said collet; and orienting means on said frame arranged in the path followed by said spindles for automatically aligning the parts-receiving opening of the spindle disposed at said first station with the arm of said parts loading means.

5. An automatic machine tool, comprising: a frame; a spindle table rotatably supported by said frame; a plurality of spindles rotatably carried by said spindle table; a driven disc element on each of said spindles; power-operated means on said frame that rotates a driving disc element; and endless flexible element extending transversely to the axis of rotation of said table and drivingly connecting said driving disc element to certain of said driven disc elements; and idler disc means rotatably supported by said frame, said idler disc means being movable in a plane transverse to the axis of rotation of said table to be selectively engageable with said flexible element so as to vary the path followed by said flexible element and thereby serving to adjust the number of driven disc elements contacted by said flexible element.

6. In an automatic machine tool having a frame, a spindle table rotatably supported by said frame and power-operated means for effecting periodic rotation of said table, a spindle, comprising: a housing having means to secure it to said spindle table; a sleeve rotatably supported by said housing, said sleeve being formed with an axial bore, the front portion of which merges into a transversely extending parts-receiving slot; a collet mounted at the front of said sleeve with its rear surface exposed to said slot; a plunger axially slidably disposed in the bore of said sleeve, said plunger having a head at its front end movable towards and away from the rear surface of said collet, and the rear end of said plunger protruding through the rear of said sleeve bore; a tube axially slidably disposed in said sleeve bore and slidably encompassing said plunger, the rear end of said tube being formed with a radially extending latch element; latch finger means engageable with said latch element mounted on said sleeve; spring means interposed between said tube and said plunger constantly biasing them apart; and second spring means interposed between said sleeve and said tube constantly biasing the latter rearwardly relative to said tube.

7. The combination set forth in claim 6 wherein a sheave is non-rotatably affixed to said sleeve.

8. An automatic machine tool for machining parts having a head and a shank, comprising: a frame; a spindle table rotatably supported by said frame; a plurality of spindles rotatably supported by said spindle table, each of said spindles being formed at its front portion with a transversely extending parts-receiving slot; a collet mounted in each of said spindles in communication with said parts-receiving slot, said collets each being formed with an aperture that receives the shank of said part; power-operated means on said frame to effect periodic rotation of said spindle table and thereby progressively move said spindles from a "load-unload" station to a plurality of other stations; an orienting surface formed on each of said spindles; a part holding member in each spindle having a head that enters said slot to abut the head of a part and urge it against said collet; parts loading means operatively connected to said frame and having an arm for inserting unfinished parts through the parts-receiving slot of a spindle disposed at said "load-unload" station with the shank of said part aligned with the aperture of said spindle's collet; and strip means formed of said frame in the path followed by said spindles, said strip means engaging the orienting surface of each spindle as it is moved into said "load-unload" station so as to align its parts-receiving slot with said parts loading means.

9. An automatic machine tool for machining parts having a head and a shank, comprising: a frame; a spindle table rotatably supported by said frame; a plurality of spindles rotatably supported by said spindle table, each of said spindles being formed at its front portion with a transversely extending parts-receiving slot; a collet mounted in each of said spindles in communication with said parts-receiving slot, said collets each being formed with an aperture that receives the shank of said part; power-operated means on said frame to effect periodic rotation of said spindle table and thereby progressively move said spindles from a "load-unload" station to a plurality of other stations; an orienting surface formed on each of said spindles; a part holding member in each spindle having a head that enters said slot to abut the head of a part and urge it against said collet; parts loading means operatively connected to said frame and having an arm for inserting unfinished parts through the parts-receiving slot of a spindle disposed at said "load-unload" station with the shank of said part aligned with the aperture of said spindle's collet; second power-operated means on said frame; an endless flexible element connecting said second power-operated means with said spindles so as to effect rotation of the latter at certain of said stations other than said "load-unload" station; and strip means formed on said frame in the path followed by said spindles, said strip means engaging the orienting surface of each spindle as it is moved into said "load-unload" station so as to align its parts-receiving slot with said parts loading means.

10. An automatic machine tool, comprising: a frame; a spindle table rotatably supported by said frame; a plurality of spindles rotatably supported by said spindle table, each of said spindles being formed at its front portion with a transversely extending parts-receiving slot; a collet mounted at the front of each of said spindles so as to receive a part from said slot; power-operated means on said frame to effect periodic rotation of said spindle table and thereby progressively move said spindles from a "load-unload" station to a plurality of other stations including an "inspection" station immediately preceding said "load-unload" station; an orienting surface formed on each of said spindles; power-operated friction wheel means engageable with each spindle when the latter is disposed at said "inspection" station; a rocker member pivotally supported by said frame and having a guide strip slidably engageable with the orienting surface of each spindle while the latter is disposed at the "inspection" station and is being moved therefrom towards said "load-unload" station; parts loading means operatively connected to said frame for inserting unfinished parts through the parts-receiving slot and into the collet of a spindle disposed at said "load-unload" station; a part holding member in each spindle that enters said slot to abut a part and retain it against the collet of said spindle; and an anchoring strip formed on said frame to receive the orienting surface of each spindle as the latter slides off said guide strip and thereby align the parts-receiving slot of said spindle with said parts loading means.

11. An automatic machine tool as set forth in claim 10 wherein said friction wheel means is carried by an arm pivotally secured to said frame, latch means are interposed between said arm and said rocker member to maintain said friction wheel against said spindle, and said frame is provided with means for automatically releasing said latch means after said spindle has been rotated a predetermined number of degrees.

12. In an automatic machine tool having a frame, a spindle table rotatably supported by said frame, a plurality of spindles rotatably carried by said table and formed at their front ends with a transversely extending parts-receiving slot, and power-operated means for effecting periodic rotation of said spindle table so as to progressively move said spindles from a "load-unload" station to a plurality of other stations, a parts feeding mechanism, comprising: a shaft rotatably supported by said frame; a rocker arm member journaled on said frame and having parts grasping means formed on its free end; means interposed between said shaft and said parts grasping means for actuating the latter upon relative rotation therebetween in excess of a predetermined number of degrees; a stop element on said rocker arm member; abutment means formed on said frame and engageable by said stop element after said rocker arm member has been pivoted through a number of degrees less than said predetermined number; and means yieldingly frictionally interconnecting said rocker arm member and said shaft for concurrent rotation.

13. The combination of claim 12 wherein said last-mentioned means includes a coil compression spring encircling said shaft.

14. In an automatic machine tool having a frame, a spindle table rotatably supported by said frame, a plurality of spindles rotatably carried by said table and formed at their front ends with a transversely extending parts-receiving slot, and power-operated means for effecting periodic rotation of said spindle table so as to progressively move said spindles from a "load-unload" station to a plurality of other stations, a parts feeding mechanism, comprising: a shaft rotatably supported by said frame; a rocker arm member journaled on said shaft and having a fixed finger on its free end; a movable finger adjacent said fixed finger, said movable finger being operatively connected to a cam element; a disc keyed to said shaft adjacent said rocker arm member and formed with a cam surface engageable with said cam element; a stop member on said rocker arm member; a pair of abutment elements on said frame alternately engageable by said stop member; and means yieldingly frictionally interconnecting said rocker arm member and said shaft for concurrent rotation whereby the free end of said rocker arm member will be alternately moved into and out of the parts-receiving slot of a spindle disposed at said "load-unload" station with said movable finger being maintained proximate said fixed finger as said free end enters said slot and said cam surface and cam element cooperating to separate said movable finger from said fixed finger while said free end is positioned within said slot.

15. In an automatic machine tool having a frame, a spindle table rotatably supported by said frame, a plurality of spindles rotatably carried by said table and formed at their front ends with a transversely extending parts-receiving slot, power-operated means for effecting periodic rotation of said spindle table so as to progressively move said spindles from a "load-unload" station to a plurality of other stations, and a parts-releasing mechanism having a gate, a parts feeding mechanism, comprising: a shaft rotatably supported by said frame; a rocker arm member journaled on said frame and having parts grasping means formed on its free end; means interposed between said shaft and said parts grasping means for actuating the latter upon relative rotation therebetween in excess of a predetermined number of degrees; a stop element on said rocker arm member; abutment means formed on said frame and engageable by said stop element after said rocker arm member has been pivoted through a number of degrees less than said predetermined number; a parts release finger member journaled by said shaft and having its free end operatively connected to the gate of said parts-releasing mechanism; and means yieldingly frictionally interconnecting said rocker arm member and said parts release finger member to said shaft for concurrent rotation.

16. The combination of claim 15 wherein said last-mentioned means includes coil compression spring means encircling said shaft.

17. In an automatic machine tool having a frame, a spindle table rotatably supported by said frame, a plurality of spindles rotatably carried by said table and formed at their front ends with a transversely extending parts-receiving slot, power-operated means for effecting periodic rotation of said spindle table so as to progressively move said spindles from a "load-unload" station to a plurality of other stations, and a parts-releasing mechanism having a gate, a parts feeding mechanism, comprising: a shaft rotatably supported by said frame; a rocker arm member journaled on said shaft and having a fixed finger on its free end; a movable finger adjacent said fixed finger, said movable finger being operatively connected to a cam element; a disc keyed to said shaft adjacent said rocker arm member and formed with a cam surface engageable with said cam element; a stop member on said rocker arm member; a pair of abutment elements on said frame alternately engageable by said stop member; a parts release finger member journaled by said shaft and having its free end operatively connected to the gate of said parts-releasing mechanism; means yieldingly frictionally interconnecting said rocker arm member and said shaft for concurrent rotation whereby the free end of said rocker arm member will be alternately moved into and out of the parts-receiving slot of a spindle disposed at said "load-unload" station with said movable finger being maintained proximate said fixed finger as said free end enters said slot and said cam surface and cam element cooperating to separate said movable finger from said fixed finger while said free end is positioned within said slot; and means yieldingly frictionally interconnecting said parts release finger member to said shaft for concurrent rotation.

18. An automatic machine tool for machining parts having a head and a shank, comprising: a frame; a spindle table rotably supported by said frame; a plurality of spindles rotatably carried by said spindle table, said spindles each being formed with a parts-receiving opening that is transverse to the spindle's axis of rotation; a collet mounted in each spindle in communication with its parts-receiving opening; power-operated means on said frame; means interposed between said frame and said spindle table for effecting periodic rotation of the latter so as to progressively move said spindles from a first station at which unfinished parts are loaded thereinto to a plurality of additional stations with said spindles being stopped against rotation relative to said table at said first station; an endless flexible element drivingly connecting said power-operated means with said spindles so as to effect rotation of the latter at certain of said stations other than said first station; parts-loading means on said frame for inserting unfinished parts through the parts-receiving opening of a spindle disposed at said first station and positioning the shank thereof in alignment with the aperture of said collet; part holding means in each spindle for urging unfinished parts into said collet and retaining said unfinished parts during machining of said parts; and means interposed between said frame and said spindles for automatically orienting the parts-receiving opening of the spindle disposed at said first station with respect to said parts loading means.

19. An automatic machine tool for machining parts having a head and a shank, comprising: a frame; a spindle table rotatably supported by said frame; a plurality of spindles rotatably carried by said spindle table, said spindles each being formed with a parts-receiving opening that is transverse to the spindle's axis of rotation; a collet mounted in each spindle in communication with its parts-receiving opening; power-operated means on said frame; means interposed between said frame and said spindle table for effecting periodic rotation of the latter so as to progressively move said spindles from a first station at which unfinished parts are loaded thereinto to a plurality of additional stations, with said spindles being stopped against rotation relative to said table at said first station; an endless flexible element drivingly connecting said power-operated means to said spindles so as to effect rotation of the latter at certain of said stations other than said first station; parts-loading means on said frame having an arm that is extendible into the parts-receiving opening of a spindle disposed at said first station and aligns the shank of an unfinished part with the aperture of said spindle's collet; a parts holding member in each spindle having a head that enters said opening to abut the head of said part and urge it against said collet; and orienting means on said frame arranged in the path followed by said spindles for automatically aligning the parts-receiving opening of the spindle disposed at said first station with the arm of said parts-loading means.

20. An automatic machine tool for machining parts having a head and a shank, comprising: a frame; a spindle table rotatably supported by said frame; a plurality of spindles rotatably carried by said spindle table, said spindles each being formed with a parts-receiving opening that is transverse to the spindle's axis of rotation; a collet mounted in each spindle in communication with its parts-receiving opening; power-operated means on said frame; means interposed between said frame and said spindle table for effecting periodic rotation of the latter so as to progressively move said spindles from a first station at which unfinished parts are loaded thereinto and finished parts are unloaded therefrom to a plurality of additional stations, with said spindles being stopped against rotation relative to said table at said first station; an endless flexible element drivingly connecting said power-operated means with said spindles so as to effect rotation of the latter at certain of said stations other than said first station; parts-loading means on said frame having an arm that is extendible into the parts-receiving opening of a spindle disposed at said first station and aligns the shank of an unfinished part with the aperture of said spindle's collet; a part-holding member in each spindle having a head that enters said opening to abut the head of said part and urge it against said collet; parts-ejecting means on said frame including a pin movable towards and away from the collet aperture of the spindle disposed at said first station; and means interposed between said frame and said spindles for automatically orienting the parts-receiving opening of the spindle disposed at said first station with respect to the arm of said parts-loading means.

21. An automatic machine tool for machining parts having a head and a shank, comprising: a frame; a spindle table rotatably supported by said frame; a plurality of spindles rotatably carried by said spindle table, said spindles each being formed with a parts-receiving opening that is transverse to the spindle's axis of rotation; a collet mounted in each spindle in communication with its parts-receiving opening; power-operated means on said frame; means interposed between said frame and said spindle table for effecting periodic rotation of the latter so as to progressively move said spindles from a first station at which unfinished parts are loaded thereinto to a plurality of additional stations, with said spindles being stopped against rotation relative to said table at said first station; driving means connecting said power-operated means with said spindles so as to effect rotation of the latter at certain of said stations other than said first station; parts-loading means on said frame for inserting unfinished parts through the parts-receiving opening of a spindle disposed at said first station and positioning the shank thereof in alignment with the aperture of said collet; part holding means in each spindle for urging unfinished parts into said collet and retaining said unfinished parts during machining of said parts; and means interposed between said frame and said spindles for automatically orienting the parts-receiving opening of the spindle disposed at said first station with respect to said parts loading means.

22. An automatic machine tool for machining parts having a head and a shank, comprising: a frame; a spindle table rotatably supported by said frame; a plurality of spindles rotatably carried by said spindle table, said spindles each being formed with a parts-receiving opening that is transverse to the spindle's axis of rotation; a collet mounted in each spindle in communication with its parts-receiving opening; power-operated means on said frame; means interposed between said frame and said spindle table for effecting periodic rotation of the latter so as to progressively move said spindles from a first station at which unfinished parts are loaded thereinto to a plurality of additional stations with said spindles being stopped against rotation relative to said table at said first station; means drivingly connecting said power-operated means to said spindles so as to effect rotation of the latter at certain of said stations other than said first station; parts-loading means on said frame having an arm that is extendible into the parts-receiving opening of a spindle disposed at said first station and aligns the shank of an unfinished part with the aperture of said spindle's collet; a parts holding member in each spindle having a head that enters said opening to abut the head of said part and urge it against said collect; and orienting means on said frame arranged in the path followed by said spindles for automatically aligning the parts-receiving opening of the spindle disposed at said first station with the arm of said parts-loading means.

23. An automatic machine tool for machining parts having a head and a shank, comprising: a frame; a spindle table rotatably supported by said frame; a plurality of spindles rotatably carried by said spindle table, said spindles each being formed with a parts-receiving opening that is transverse to the spindle's axis of rotation; a collet mounted in each spindle in communication with its parts-receiving opening; power-operated means on said frame; means interposed between said frame and said spindle table for effecting periodic rotation of the latter so as to progressively move said spindles from a first station at which unfinished parts are loaded thereinto and finished parts are unloaded therefrom to a plurality of additional stations, with said spindles being stopped against rotation relative to said table at said first station; power transfer means drivingly connecting said power-operated means with said spindles so as to effect rotation of the latter at certain of said stations other than said first station; parts-loading means on said frame having an arm that is extendible into the parts-receiving opening of a spindle disposed at said first station and aligns the shank of an unfinished part with the aperture of said spindle's collet; a part holding member in each spindle having a head that enters said opening to abut the head of said part and urge it against said collet; parts-ejecting means on said frame including a pin movable towards and away from the collet aperture of the spindle disposed at said first station; and means interposed between said frame and said spindles for automatically orienting the parts-receiving opening of the spindle disposed at said first station with respect to the arm of said parts-loading means.

24. An automatic machine tool for machining parts having a head and a shank, comprising: a frame; a spindle table rotatably supported by said frame; a plurality of spindles carried by said spindle table, each of said spindles being formed with a radially extending parts-receiving opening; means interposed between said frame and said table for periodically rotating said table past a predetermined number of stations with said table being stopped so as to position said spindles at said stations for a predetermined period of time; a collet mounted in each of said spindles in communication with said parts-receiving opening, said collets each being formed with an aperture that receives the shank of said part; a part holding member in each spindle having an axially movable head element that enters said opening to abut the head of of said part and urge it against said collet; parts loading means operatively connected to said frame for inserting unfinished parts through said parts-receiving opening and positioning the shank thereof in alignment with the aperture of said collet while said table is stopped; and parts unloading means operatively connected to said frame and including an axially movable push out pin that ejects finished parts out of the aperture of said collet and through said parts-receiving opening while said table is stopped.

25. An automatic machine tool for machining parts having a head and a shank, comprising: a frame; a spindle table rotatably supported by said frame; a plurality of spindles carried by said spindle table, each of said spindles being formed with a radially extending parts-receiving opening; means interposed between said frame and said table for periodically rotating said table past a predetermined number of stations with said table being stopped so as to position said spindles at said stations for a predetermined period of time; a collet mounted in each of said spindles in communication with said parts-receiving opening, said collets each being formed with an aperture that receives the shank of said part; a part holding member in each spindle having an axially movable head element that enters said opening to abut the head of said part and urge it against said collet, said head element also being formed with a radially extending chip release opening that is in communication with the aperture of said collet and said parts-release opening; machining means on said frame that advance towards said collet while said table is stopped and forms a longitudinal bore through the shank of said part; parts loading means operatively connected to said frame for inserting unfinished parts through said parts-receiving opening and positioning the shank thereof in alignment with the aperture of said collet while said table is stopped; and parts unloading means operatively connected to said frame and including an axially movable push out pin that moves in the same direction as said machining means to eject finished parts out of the aperture of said collet and through said parts-receiving opening while said table is stopped.

26. An automatic machine tool for machining parts having a head and a shank, comprising: a frame; a spindle table rotatably supported by said frame; a plurality of spindles carried by said spindle table, each of said spindles being formed with a radially extending parts-receiving opening; means interposed between said frame and said table for periodically rotating said table past a predetermined number of stations with said table being stopped so as to position said spindles at said stations for a predetermined period of time; a collet mounted in, each of said spindles in communication with said parts-receiving opening, said collets each being formed with an aperture that receives the shank of said part; a part holding member in each spindle having an axially movable head element that enters said opening to abut the head of said part and urge it against said collet; parts loading means operatively connected to said frame for inserting unfinished parts through said parts-receiving opening and positioning the shank thereof in alignment with the aperture of said collet while said table is stopped and after a finished part has been unloaded from said collet; and parts unloading means operatively connected said frame, said means including an ejector pin that is resiliently biased towards the aperture of said collet with said pin being moved axially through said aperture so as to eject a finished part out of said aperture and through said parts-receiving opening while said table is stopped and said pin thereafter backing up an unfinished part that has been inserted through said parts-receiving opening by said parts loading means with its shank positioned in alignment with said aperture until said head element has abutted the head of said unfinished part and urged it against said collet.

27. An automatic machine tool for machining parts having a head and a shank, comprising: a frame; a spindle table rotatably supported by said frame; a plurality of spindles carried by said spindle table, each of said spindles being formed with a radially extending parts-receiving opening; means interposed between said frame and said table for periodically rotating said table past a predetermined number of stations with said table being stopped so as to position said spindles at said stations for a predetermined period of time; a collet mounted in each of said spindles in communication with said parts-receiving opening, said collets each being formed with an aperture that receives the shank of said part; a part holding member in each spindle having an axially movable head element that enters said opening to abut the head of said part and urge it against said collet, said head element also being formed with a radially extending chip release opening that is in communication with the aperture of said collet and said parts-release opening; machining means on said frame that advance towards said collet while said table is stopped and forms a longitudinal bore through the shank of said parts; parts loading means operatively connected to said frame for inserting unfinished parts through said parts-receiving opening and positioning the shank thereof in alignment with aperture of said collet while said table is stopped and after a finished part has been unloaded from said collet; and parts unloading means operatively connected to said frame, said means including an ejector pin that is resiliently biased towards the aperture of said collet with said pin being moved axially through said aperture so as to eject a finished part out of said aperture and through said parts-receiving opening while said table is stopped and said pin thereafter backing up an unfinished part that has been inserted through said parts-receiving opening by said parts loading means with its shank positioned in alignment with said aperture until said head element has abutted the head of said unfinished part and urged it against said collet.

References Cited in the file of this patent

UNITED STATES PATENTS

| | | |
|---|---|---|
| 20,789 | Griggs | July 6, 1858 |
| 1,197,825 | Hoe | Sept. 12, 1916 |
| 1,470,256 | Clay | Oct. 9, 1923 |
| 2,176,606 | Cregar | Oct. 17, 1939 |
| 2,521,209 | Fether | Sept. 5, 1950 |
| 2,526,900 | Remington | Oct. 24, 1950 |
| 2,811,876 | Batchelder | Nov. 5, 1957 |